United States Patent
Arnold

(10) Patent No.: US 7,088,130 B2
(45) Date of Patent: *Aug. 8, 2006

(54) PARTIAL TERMINATION VOLTAGE CURRENT SHUNTING

(75) Inventor: Barry J. Arnold, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/242,402

(22) Filed: Oct. 3, 2005

(65) Prior Publication Data

US 2006/0028238 A1 Feb. 9, 2006

Related U.S. Application Data

(63) Continuation of application No. 10/724,340, filed on Nov. 28, 2003, now Pat. No. 6,970,011.

(51) Int. Cl.
*H03K 19/003* (2006.01)

(52) U.S. Cl. .............................. 326/32; 326/30; 326/86; 327/108

(58) Field of Classification Search .................. 326/30, 326/32, 86; 327/108
See application file for complete search history.

(56) References Cited

U.S. PATENT DOCUMENTS

| | | | |
|---|---|---|---|
| 5,254,883 A | 10/1993 | Horowitz et al. | |
| 5,338,979 A | 8/1994 | Mammano et al. | |
| 5,359,235 A | 10/1994 | Coyle et al. | |
| 5,420,525 A | 5/1995 | Maloberti et al. | |
| 5,528,167 A | 6/1996 | Samela et al. | |
| 5,576,642 A | 11/1996 | Nguyen et al. | |
| 5,686,872 A * | 11/1997 | Fried et al. | 333/22 R |
| 5,721,875 A | 2/1998 | Fletcher et al. | |
| 5,819,099 A | 10/1998 | Ovens | |
| 5,959,481 A | 9/1999 | Donnelly et al. | |
| 5,966,042 A | 10/1999 | Werner et al. | |
| 6,121,789 A | 9/2000 | Liu et al. | |
| 6,239,621 B1 | 5/2001 | Milshtein et al. | |
| 6,356,106 B1 | 3/2002 | Greeff et al. | |
| 6,448,837 B1 | 9/2002 | Naffziger | |
| 6,483,348 B1 | 11/2002 | Naffziger | |
| 6,721,150 B1 | 4/2004 | Guerrero et al. | |
| 2002/0084826 A1 | 7/2002 | Naffziger | |
| 2003/0147482 A1 * | 8/2003 | Pasqualino et al. | 375/349 |

FOREIGN PATENT DOCUMENTS

| | | |
|---|---|---|
| EP | 0284356 A2 | 9/1988 |
| EP | 0554121 A2 | 8/1993 |
| EP | 0554121 A3 | 7/1994 |
| GB | 2373974 A | 1/2001 |

OTHER PUBLICATIONS

Gabara, Thaddeus, et al. "Forming Damped LRC Parasitic Circuits in Simultaneously Switched CMOS Output Buffers", IEEE Journal of Solid State Circuits, vol. 32, No. 3, Mar. 1997, pp. 407-418.

(Continued)

*Primary Examiner*—Vibol Tan

(57) ABSTRACT

An apparatus includes termination circuitry to terminate one or more lines. The termination circuitry draws a first current from a termination voltage supply through a termination voltage delivery network for each terminated line carrying a first signal. Partial current shunt circuitry draws a second current from the termination voltage supply through the termination voltage delivery network for each terminated line carrying a second signal. The first and second currents are distinct.

20 Claims, 14 Drawing Sheets

OTHER PUBLICATIONS

Ilkbahar, Alper, et al. "Itanium Processor System Bus Design", IEEE Journal of Solid State Circuits, vol. 36, No. 10, Oct. 2001, pp. 1565-1573.

United Kingdom Patent Office, Search Report for related foreign application No. GB0425063.5 (Mar. 24, 2005).

* cited by examiner

PARTIAL TERMINATION VOLTAGE CURRENT SHUNTING

CROSS-REFERENCE TO RELATED APPLICATIONS

This application is a continuation of application Ser. No. 10/724,340 filed Nov. 28, 2003, now U.S. Pat. No. 6,970,011.

BACKGROUND

One packaged integrated circuit (IC) having on-chip termination circuitry to terminate input/output (I/O) lines draws current from a termination voltage supply depending on the signal on each terminated I/O line. As the signal on a terminated I/O line varies, however, the amount of current drawn through a termination voltage delivery network from the termination voltage supply varies, introducing noise into the supplied termination voltage due to parasitic inductances in, for example, package leads and bond wires of the termination voltage delivery network. Such noise limits the speed or frequency at which signals may be reliably transmitted and/or received on the terminated I/O lines.

A static current shunt may be used for each terminated I/O line to continue drawing the same amount of current from the termination voltage supply regardless of the signal on the terminated I/O line to avoid variations in current drawn through the termination voltage delivery network and therefore to avoid noise in the supplied termination voltage. The static current shunt for each terminated I/O line draws the same amount of current as the termination circuitry for that line and may therefore substantially increase the amount of power consumed by the IC. The increased power consumption by the IC may add to the cost and/or complexity of the IC and/or of the systems using the IC to account for and dissipate the resulting increased heat, may fail to meet power requirements for systems using the IC, and/or may add to the cost to operate the IC.

SUMMARY

One method includes providing a plurality of lines terminated by termination circuitry. At least one line has an associated current shunt. A first current is drawn from a termination voltage supply through a termination voltage delivery network to the termination circuitry for each line carrying a first signal. A second current is drawn from the termination voltage supply through the termination voltage delivery network to the associated current shunt for each line carrying a second signal. The first and second currents are distinct.

One apparatus includes termination circuitry to terminate one or more lines. The termination circuitry draws a first current from a termination voltage supply through a termination voltage delivery network for each terminated line carrying a first signal. Partial current shunt circuitry draws a second current from the termination voltage supply through the termination voltage delivery network for each terminated line carrying a second signal. The first and second currents are distinct.

BRIEF DESCRIPTION OF DRAWINGS

One or more embodiments of the present invention are illustrated by way of example and not limitation in the figures of the accompanying drawings, in which like references indicate similar elements and in which.

DETAILED DESCRIPTION

Figure 1:
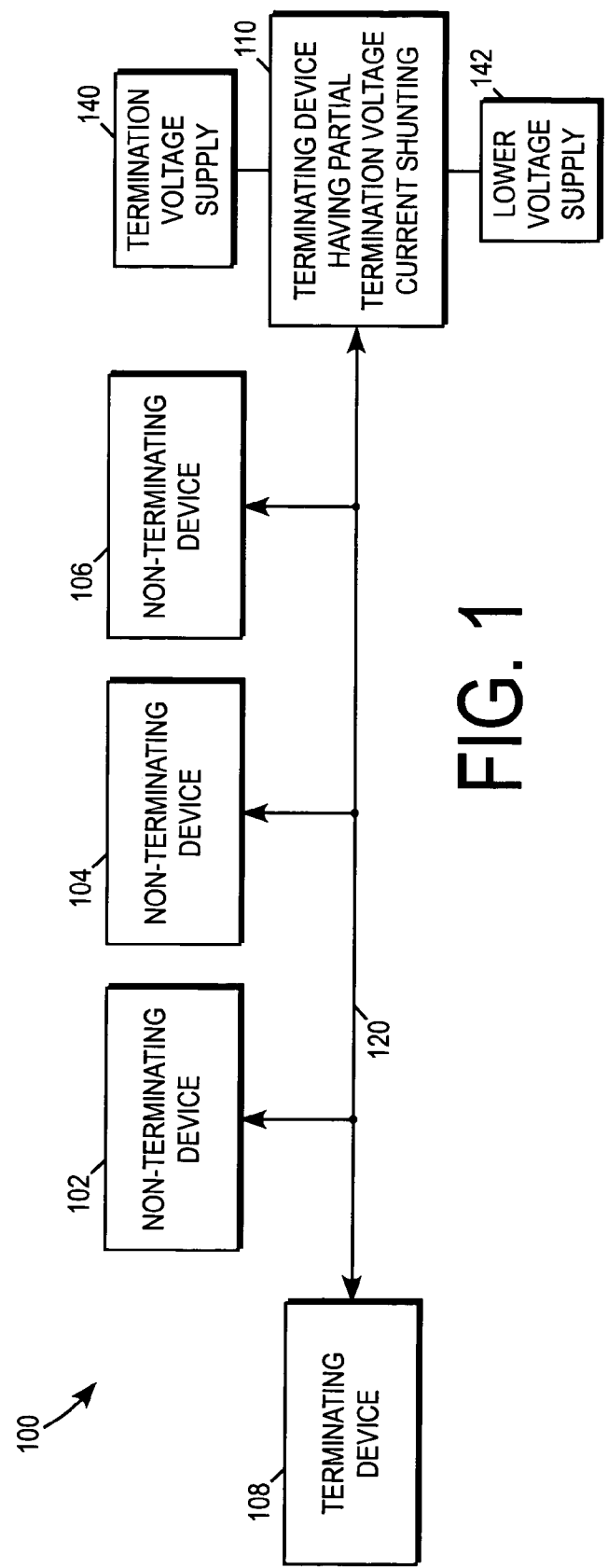
FIG. 1 illustrates, for one embodiment, an example system comprising a terminating device having partial termination voltage current shunting.

FIG. 1 illustrates, for one embodiment, an example system 100 comprising a plurality of devices 102, 104, 106, 108, and 110 coupled to a bus 120.

Devices 102, 104, 106, 108, and/or 110 for one embodiment may each comprise any circuitry suitable to perform any one or more functions. Devices 102, 104, 106, 108, and/or 110 for one embodiment may each comprise one or more integrated circuits in a package and may or may not be mounted on the same circuit board with any other device 102, 104, 106, 108, and/or 110. Bus 120 may comprise any suitable number of one or more lines at each device 102, 104, 106, 108, and 110 and may be implemented using any suitable communications medium or media. Devices 102–110 and bus 120 for one embodiment, as illustrated in FIG. 1, may be configured in a double-terminated multidrop or multipoint bus configuration to allow devices 102, 104, 106, 108, and/or 110 to communicate with one another over bus 120.

Devices 102, 104, and 106 are non-terminating devices. Devices 102–106 may comprise any suitable circuitry to transmit signals onto one or more lines of bus 120 and/or to receive signals from one or more lines of bus 120 in any suitable manner. Although illustrated as having three non-terminating devices, system 100 for another embodiment may have zero or any suitable number of one or more non-terminating devices.

Devices 108 and 110 are terminating devices. Devices 108 and 110 for one embodiment may comprise any suitable circuitry to transmit signals onto one or more lines of bus 120 and/or to receive signals from one or more lines of bus 120 in any suitable manner.

Device 108 may comprise any suitable termination circuitry to terminate one or more lines of bus 120. Device 108 for one embodiment may comprise only termination circuitry.

Device 110 may comprise any suitable circuitry to terminate one or more lines of bus 120. Device 110 is coupled to a termination voltage supply 140 and uses termination voltage supply 140 in terminating one or more lines of bus 120. Termination voltage supply 140 may supply power at any suitable voltage level, such as at approximately 1.2 volts (V) for example. Device 110 also comprises circuitry to perform partial termination voltage current shunting for one or more lines of bus 120 to shunt current from termination voltage supply 140 to a suitable lower voltage supply 142, such as ground for example, coupled to device 110 to help define a range in which current drawn from termination voltage supply 140 may vary. In this manner, device 110 may help reduce its power consumption to a desired level while still helping to stabilize the supply of power from termination voltage supply 140 at a tolerable noise level. Device 110 may alternatively help stabilize the supply of power from termination voltage supply 140 at a desired noise level while still helping to reduce its power consumption to a tolerable level.

Although illustrated in a double-terminated multidrop or multipoint bus configuration, device 110 may be configured with any suitable number of one or more other terminating and/or non-terminating devices in any suitable bus configuration.

Figures 2, 3:
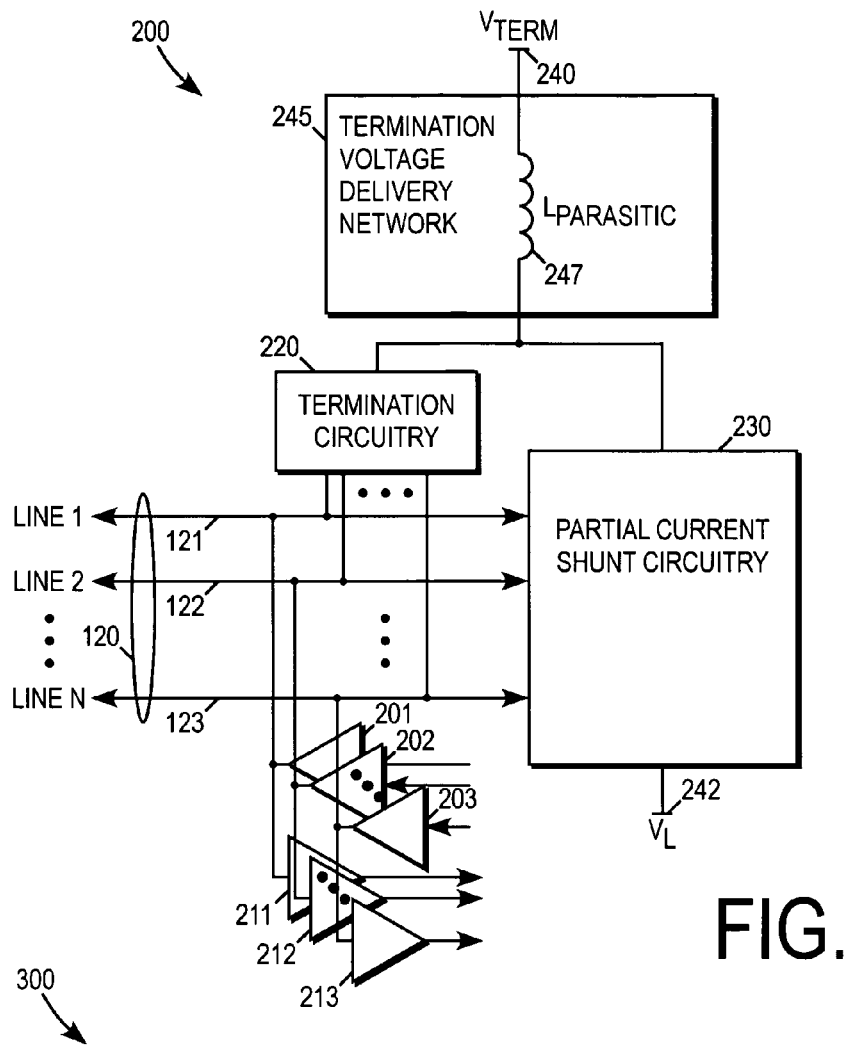
FIG. 2 illustrates, for one embodiment, a block diagram of circuitry for a device having partial termination voltage current shunting.
FIG. 3 illustrates, for one embodiment, a flow diagram to perform partial termination voltage current shunting.

As illustrated in FIG. 2, device 110 for one embodiment may comprise circuitry 200. Circuitry 200 for one embodiment comprises transmitters 201, 202, and 203, receivers 211, 212, and 213, termination circuitry 220, partial current shunt circuitry 230, and a termination voltage delivery network 245.

Transmitters 201, 202, and 203 are coupled to transmit signals from device 110 onto input/output (I/O) lines 121, 122, and 123 of bus 120, respectively. Transmitters 201, 202, and 203 may comprise any suitable circuitry to transmit any suitable signals onto lines 121, 122, and 123, respectively. Although described in connection with three transmitters to transmit signals onto three lines of bus 120, circuitry 200 may comprise any suitable number of one or more transmitters to transmit signals onto any suitable number of one or more lines of bus 120. Circuitry 200 for another embodiment may not comprise any transmitters.

Receivers 211, 212, and 213 are coupled to receive signals from lines 121, 122, and 123, respectively, for device 110. Receivers 211, 212, and 213 may comprise any suitable circuitry to receive any suitable signals from lines 121, 122, and 123, respectively. Although described in connection with three receivers to receive signals from three lines of bus 120, circuitry 200 may comprise any suitable number of one or more receivers to receive signals from any suitable number of one or more lines of bus 120. Circuitry 200 for another embodiment may not comprise any receivers.

Termination circuitry 220 terminates lines 121, 122, and 123 of bus 120. Termination circuitry 220 is coupled to lines 121, 122, and 123 and to one or more termination voltage supply terminals collectively represented by $V_{TERM}$ terminal 240 through termination voltage delivery network 245 for coupling to termination voltage supply 140. Termination circuitry 220 may comprise any suitable circuitry to terminate lines 121, 122, and 123. Although described in connection with terminating three lines of bus 120, termination circuitry 220 may be used to terminate any suitable number of one or more lines of bus 120.

Transmitters 201, 202, and 203 for one embodiment may each comprise a pull-down transistor coupled between line 121, 122, and 123, respectively, and a voltage supply terminal for coupling to any suitable lower voltage supply. Transmitters 201, 202, and 203 for one embodiment may then be used to transmit a first signal at a voltage level less than, or alternatively less than or equal to, a suitable threshold onto line 121, 122, and 123, respectively, by activating the pull-down transistor. Transmitters 201, 202, and 203 for one embodiment may then also be used to transmit a second signal at a voltage level greater than, or alternatively greater than or equal to, a suitable threshold onto line 121, 122, and 123, respectively, by deactivating the pull-down transistor to allow termination circuitry 220 to pull line 121, 122, and 123, respectively, to a higher voltage. Transmitters 201, 202, and 203 for one embodiment may each comprise a supplemental pull-up transistor coupled between line 121, 122, and 123, respectively, and a voltage supply terminal for coupling to any suitable voltage supply. Transmitters 201, 202, and 203 for one embodiment may then be used to help pull lines 121, 122, and 123, respectively, to a higher voltage by activating the pull-up transistor while deactivating the pull-down transistor. The first and second signals for one embodiment may correspond to logical one and logical zero bits, respectively. For another embodiment, the first and second signals may correspond to logical zero and logical one bits, respectively.

Receivers 211, 212, and 213 for one embodiment may compare the voltage level of a signal on lines 121, 122, and 123, respectively, to any suitable one or more thresholds to identify whether the signal is at a voltage level greater than, or alternatively greater than or equal to, a threshold and/or whether the signal is at a voltage level less than, or alternatively less than or equal to, a threshold. Receivers 211, 212, and 213 for one embodiment may then generate and output any suitable signal identifying the signal received on lines 121, 122, and 123, respectively. Receivers 211, 212, and 213 may be coupled to any suitable one or more voltage supply terminals for coupling to any suitable one or more voltage supplies to receive signals on lines 121, 122, and 123, respectively.

Partial current shunt circuitry 230 shunts current for one or more of terminated lines 121, 122, and 123. Partial current shunt circuitry 230 is coupled to $V_{TERM}$ terminal 240 through termination voltage delivery network 245 for coupling to termination voltage supply 140, to one or more lower voltage supply terminals collectively represented by a $V_L$ terminal 242 for coupling to lower voltage supply 142, and to one or more of lines 121, 122, and 123. Partial current shunt circuitry 230 may comprise any suitable circuitry to shunt current for one or more of terminated lines 121, 122, and 123. Although described in connection with shunting current for one or more of three lines of bus 120, partial current shunt circuitry 230 may be used to shunt current for any suitable number of one or more terminated lines of bus 120.

Termination voltage delivery network 245 delivers power from termination voltage supply 140 to termination circuitry 220 and to partial current shunt circuitry 230. For one embodiment where device 110 comprises one or more integrated circuits in a package, termination voltage delivery network 245 for one embodiment may comprise any suitable one or more conductive structures to deliver power from termination voltage supply 140 to one or more integrated circuits through the package. Suitable conductive structures may include, for example, one or more leads, one or more bonding wires, one or more conductive bumps, one or more conductive balls, one or more conductive planes, and/or one or more vias filled with conductive material between conductive planes. Because conductive structures have parasitic inductances in series with current flow as represented in FIG. 2 with inductor $L_{PARASITIC}$ 247, variation in current (i.e., dI/dt) flowing through termination voltage delivery network 245 introduces noise into the delivered termination voltage. The more the current varies and the faster and more often the current varies, the more noise may be introduced into the delivered termination voltage and therefore limit the speed or frequency at which signals may be reliably transmitted and/or received on lines 121, 122, and/or 123.

Circuitry 200 performs partial termination voltage current shunting to help define a range in which current drawn from termination voltage supply 140 through termination voltage delivery network 245 may vary and therefore to help limit the level of noise resulting from current variation. Circuitry 200 for one embodiment may perform partial termination voltage current shunting in accordance with a flow diagram 300 of FIG. 3.

For block 302 of FIG. 3, termination circuitry 220 draws current from termination voltage supply 140 and through termination voltage delivery network 245 in response to a first signal on one or more of terminated lines 121, 122, and 123. Termination circuitry 220 may draw any suitable amount of current from termination voltage supply 140 in response to any suitable signal on a line. Termination circuitry 220 for one embodiment may draw current from termination voltage supply 140 in response to a signal at a voltage level less than, or alternatively less than or equal to, a predetermined threshold on a line.

For block 304, partial current shunt circuitry 230 shunts current from termination voltage supply 140 and through termination voltage delivery network 245 in response to a second signal on one or more of terminated lines 121, 122, and 123. Partial current shunt circuitry 230 may draw any suitable amount of current from termination voltage supply 140 in response to any suitable signal on a line. Partial current shunt circuitry 230 for one embodiment may draw current from termination voltage supply 140 in response to a signal at a voltage level greater than, or alternatively greater than or equal to, a predetermined threshold on a line.

Partial current shunt circuitry 230 draws current through termination voltage delivery network 245 to help define a range of current variation through termination voltage delivery network 245. For one embodiment where termination circuitry 220 may draw a first total amount of current $I_{T1}$ through termination voltage delivery network 245 if and when a first signal appears on all terminated lines 121, 122, and 123, partial current shunt circuitry 230 for one embodiment may draw a second total amount of current $I_{T2}$ less than the first total amount of current $I_{T1}$ through termination voltage delivery network 245 if and when a second signal appears on all of terminated lines 121, 122, and 123 for which current is shunted through termination voltage delivery network 245. As signals on lines 121, 122, and 123 vary between the first and second signals, the current drawn through termination voltage delivery network 245 by termination circuitry 220 and/or partial current shunt circuitry 230 then generally varies between approximately $I_{T1}$ and approximately $I_{T2}$. Partial current shunt circuitry 230 for one embodiment may therefore help define a minimum amount of current to be drawn through termination voltage delivery network 245 to help define a range of current variation through termination voltage delivery network 245. Using partial current shunt circuitry 230 to draw less current than that drawn by termination circuitry 220 helps device 110 consume less power relative to shunting the same amount of current as that drawn by termination circuitry 220 while still helping device 110 to stabilize the supply of power from termination voltage supply 140 at a tolerable noise level.

As one example, partial current shunt circuitry 230 for one embodiment may draw a second total amount of current $I_{T2}$ of approximately 90% of the first total amount of current $I_{T1}$ to help define a range of current variation between approximately 90% of the first total amount of current $I_{T1}$ and approximately 100% of the first total amount of current $I_{T1}$. For other examples, partial current shunt circuitry 230 for one embodiment may draw a second total amount of current $I_{T2}$ at any suitable value less than, or alternatively less than or equal to, approximately 95%, 90%, 85%, 80%, 75%, 70%, 65%, 60%, 55%, 50%, 45%, 40%, 35%, 30%, 25%, 20%, 15%, 10%, or 5% of the first total amount of current $I_{T1}$. Partial current shunt circuitry 230 for one embodiment may draw a second total amount of current $I_{T2}$ at any suitable value greater than, or alternatively greater than or equal to, approximately 95%, 90%, 85%, 80%, 75%, 70%, 65%, 60%, 55%, 50%, 45%, 40%, 35%, 30%, 25%, 20%, 15%, 10%, or 5% of the first total amount of current $I_{T1}$. Partial current shunt circuitry 230 for one embodiment may draw a second total amount of current $I_{T2}$ at approximately 87.5%, 75%, 62.5%, 50%, 37.5%, 25%, or 12.5% of the first total amount of current $I_{T1}$.

Circuitry 200 may perform operations for blocks 302–304 in any suitable order and may or may not overlap in time the performance of any suitable operation with any other suitable operation.

Device 110 for one embodiment may comprise a plurality of termination voltage delivery networks 245 through which current may be drawn for a respective set of one or more input/output (I/O) lines. Device 110 for one embodiment may therefore comprise separate termination circuitry 220 and separate partial current shunt circuitry 230 for each of one or more termination voltage delivery networks 245 of device 110 to help define a respective range of current variation through each such termination voltage delivery network 245. The range of current variation through each such termination voltage delivery network 245 may or may not be the same.

Device 108 of FIG. 1 for one embodiment may also have partial current shunt circuitry for one or more lines of bus 120.

Current Shunt Circuitry for Less than all Terminated Lines

Partial current shunt circuitry 230 for one embodiment may comprise current shunt circuitry for one or more terminated lines but not for one or more other terminated lines for which current is drawn through termination voltage delivery network 245.

Figure 4:
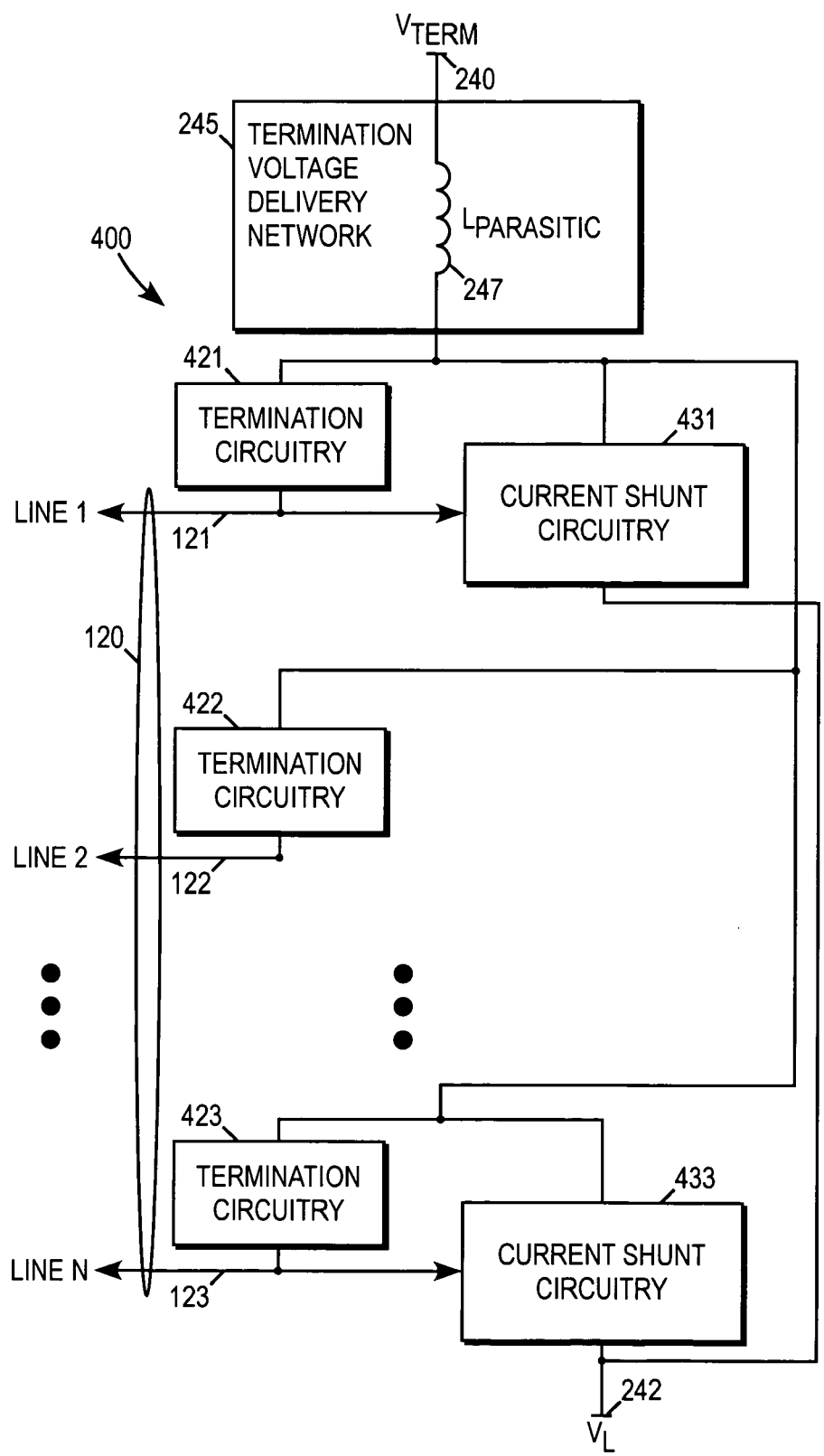
FIG. 4 illustrates, for one embodiment, a block diagram of circuitry to implement partial termination voltage current shunting.

FIG. 4 illustrates, for one embodiment, a block diagram of circuitry 400 comprising termination circuitry 421, 422, and 423 for terminated lines 121, 122, and 123, respectively, to implement termination circuitry 220 of FIG. 2 and comprising current shunt circuitry 431 and 433 for terminated lines 121 and 123, respectively, but no current shunt circuitry for terminated line 122 to implement partial current shunt circuitry 230 of FIG. 2.

Termination circuitry 421 is coupled between line 121 and $V_{TERM}$ terminal 240 for coupling to termination voltage supply 140 (FIG. 1). Termination circuitry 422 is coupled between line 122 and $V_{TERM}$ terminal 240. Termination circuitry 423 is coupled between line 123 and $V_{TERM}$ terminal 240. Termination circuitry 421, 422, and 423 for one embodiment may draw current from termination voltage supply 140 in response to a first signal on lines 121, 122, and 123, respectively. Termination circuitry 421, 422, and 423 may comprise any suitable circuitry to terminate lines 121, 122, and 123, respectively.

Figure 5:
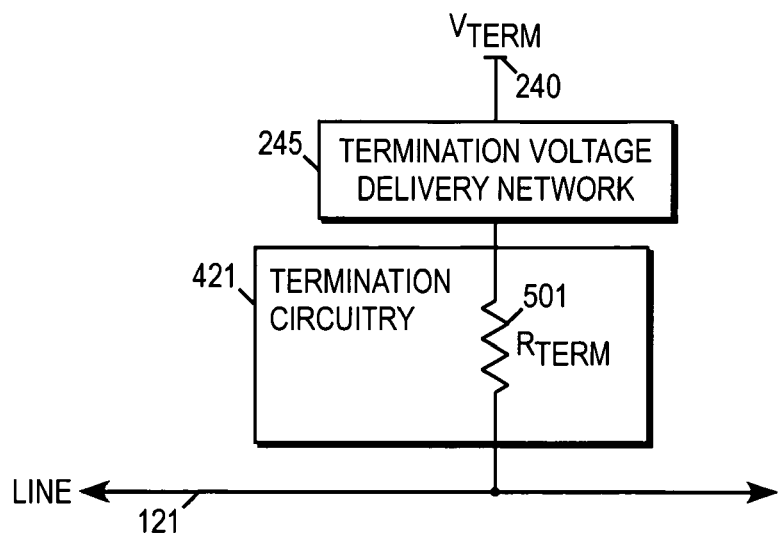
FIG. 5 illustrates, for one embodiment, a functional diagram of termination circuitry for a line.

For one embodiment, as illustrated in FIG. 5, termination circuitry 421 may comprise circuitry to function as a resistor 501 having a resistance. $R_{TERM}$ coupled between $V_{TERM}$ terminal 240 and line 121 and may draw current from $V_{TERM}$ terminal 240 based on the voltage across resistor 501. For one embodiment where termination circuitry 421 is connected directly to line 121 and to termination voltage delivery network 245 having a voltage difference $V_{NET}$ between $V_{TERM}$ terminal 240 and resistor 501, termination circuitry 421 draws current approximately equal to $(V_{TERM}-V_{NET}-V_L)/R_{TERM}$ when a first signal at approximately a lower voltage $V_L$, for example, appears on line 121 and draws minimal, if any, current when a second signal at approximately a higher voltage $V_H$ near or approximately equal to $V_{TERM}$ appears on line 121.

Resistor 501 may have any suitable resistance $R_{TERM}$ to help terminate line 121. Termination circuitry 421 for one embodiment may comprise circuitry to implement resistor 501 of a suitable resistance $R_{TERM}$ such that the impedance connected to line 121 at device 110 approximates the characteristic impedance of line 121. As one example, resistor 501 for one embodiment may be implemented with a resistance $R_{TERM}$ in the range of approximately 45 ohms to approximately 50 ohms. Resistor 501 for one embodiment may be implemented using an activated p-channel metal oxide semiconductor field effect transistor (p-MOSFET) of a suitable size.

Termination circuitry 422 and/or 423 for one embodiment may similarly function as termination circuitry 421.

Current shunt circuitry 431 and 433 are each coupled between $V_{TERM}$ terminal 240 for coupling to termination voltage supply 140 (FIG. 1) and $V_L$ terminal 242 for coupling to lower voltage supply 142 (FIG. 1). Current shunt circuitry 431 and 433 for one embodiment, as illustrated in FIG. 4, may be coupled to lines 121 and 123, respectively, to shunt current from $V_{TERM}$ terminal 240 to $V_L$ terminal 242 in response to a second signal on lines 121 and 123, respectively. Current shunt circuitry 431 and 433 may comprise any suitable circuitry to shunt any suitable amount of current for terminated lines 121 and 123, respectively.

Figure 6:
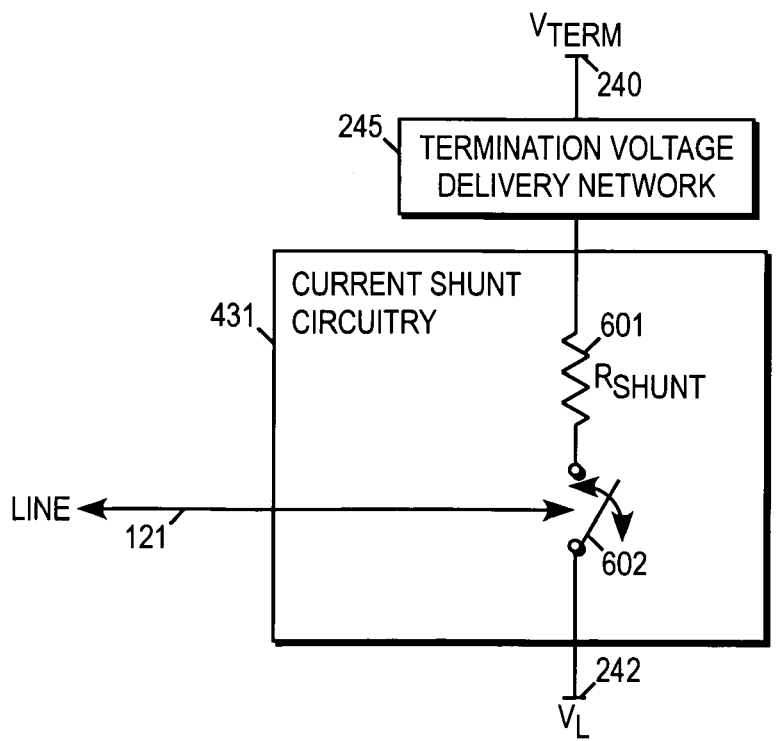
FIG. 6 illustrates, for one embodiment, a functional diagram of current shunt circuitry for a line.

For one embodiment, as illustrated in FIG. 6, current shunt circuitry 431 may comprise circuitry to function as a resistor 601 having a resistance $R_{SHUNT}$ coupled between $V_{TERM}$ terminal 240 and $V_L$ terminal 242 and may draw current from $V_{TERM}$ terminal 240 based on the voltage across resistor 601. Current shunt circuitry 431 for one embodiment may comprise circuitry to function as a switch 602 in series with resistor 601 to couple resistor 601 between $V_{TERM}$ terminal 240 and $V_L$ terminal 242 in a selective manner based on the signal on line 121. Switch 602 for one embodiment may be coupled to line 121 and activated in response to a second signal on line 121 to couple resistor 601 between $V_{TERM}$ terminal 240 and $V_L$ terminal 242. Switch 602 for one embodiment may then be deactivated in response to a first signal on line 121 to help prevent resistor 601 from being coupled between $V_{TERM}$ terminal 240 and $V_L$ terminal 242. For one embodiment where current shunt circuitry 431 is connected directly to $V_L$ terminal 242 and to termination voltage delivery network 245 having a voltage difference $V_{NET}$ between $V_{TERM}$ terminal 240 and resistor 601, current shunt circuitry 431 draws current approximately equal to $(V_{TERM}-V_{NET}-V_L)/R_{SHUNT}$ in response to the second signal on line 121.

Resistor 601 may have any suitable resistance $R_{SHUNT}$ to draw any suitable amount of current through termination voltage delivery network 245. Resistor 601 for one embodiment may have a resistance $R_{SHUNT}$ to draw approximately the same amount of current as that drawn by termination circuitry 421 through termination voltage delivery network 245. Resistor 601 for one embodiment may have a resistance $R_{SHUNT}$ to draw more or less current than that drawn by termination circuitry 421. As examples, resistor 601 for one embodiment may be implemented with a resistance $R_{SHUNT}$ of any suitable value to draw current through termination voltage delivery network 245 at any suitable value less than, or alternatively less than or equal to, approximately 100%, 95%, 90%, 85%, 80%, 75%, 70%, 65%, 60%, 55%, 50%, 45%, 40%, 35%, 30%, 25%, 20%, 15%, 10%, or 5% of the amount of current drawn by termination circuitry 421 through termination voltage delivery network 245. Resistor 601 for one embodiment may be implemented with a resistance $R_{SHUNT}$ of any suitable value to draw current through termination voltage delivery network 245 at any suitable value greater than, or alternatively greater than or equal to, approximately 95%, 90%, 85%, 80%, 75%, 70%, 65%, 60%, 55%, 50%, 45%, 40%, 35%, 30%, 25%, 20%, 15%, 10%, 5%, or 0% of the amount of current drawn by termination circuitry 421 through termination voltage delivery network 245. As an example where termination circuitry 421 comprises circuitry to function as resistor 501 having a resistance $R_{TERM}$ of approximately 45 ohms, resistor 601 for one embodiment may be implemented with a resistance $R_{SHUNT}$ in the range of approximately 45 ohms to approximately 900 ohms, for example, to draw current through termination voltage delivery network 245 in the range of approximately 100% to approximately 5% of the amount of current drawn by resistor 501 through termination voltage delivery network 245. Resistor 601 and switch 602 for one embodiment may both be implemented using a single n-channel metal oxide semiconductor field effect transistor (n-MOSFET) of a suitable size with its gate coupled to receive the signal on line 121.

Current shunt circuitry 433 for one embodiment may similarly function as current shunt circuitry 431 and may draw approximately the same current as, less current than, or more current than that drawn by termination circuitry 423 through termination voltage delivery network 245. Current shunt circuitry 433 may or may not draw the same amount of current through termination voltage delivery network 245 as current shunt circuitry 431.

By not comprising current shunt circuitry for one or more terminated lines, such as terminated line 122 of FIG. 4, and by drawing a suitable amount of current for one or more other terminated lines, such as lines 121 and 123 of FIG. 4, partial current shunt circuitry 230 for one embodiment may draw a total amount of current $I_{T2}$ less than the total amount of current $I_{T1}$ that may be drawn by termination circuitry 220 through termination voltage delivery network 245 if and when a second signal appears on all terminated lines having current shunt circuitry that draws current through termination voltage delivery network 245. Partial current shunt circuitry 230 for one embodiment may therefore help define a minimum amount of current to be drawn through termination voltage delivery network 245 to help define a range of current variation through termination voltage delivery network 245. Partial current shunt circuitry 230 for one embodiment may therefore help device 110 consume less power while still helping device 110 to stabilize the supply of power from termination voltage supply 140 at a tolerable noise level.

Partial Current Shunt Circuitry for Individual Terminated Lines

Partial current shunt circuitry 230 for another embodiment may comprise partial current shunt circuitry for one or more and possibly all of the terminated lines for which current is drawn through termination voltage delivery network 245.

Figure 7:
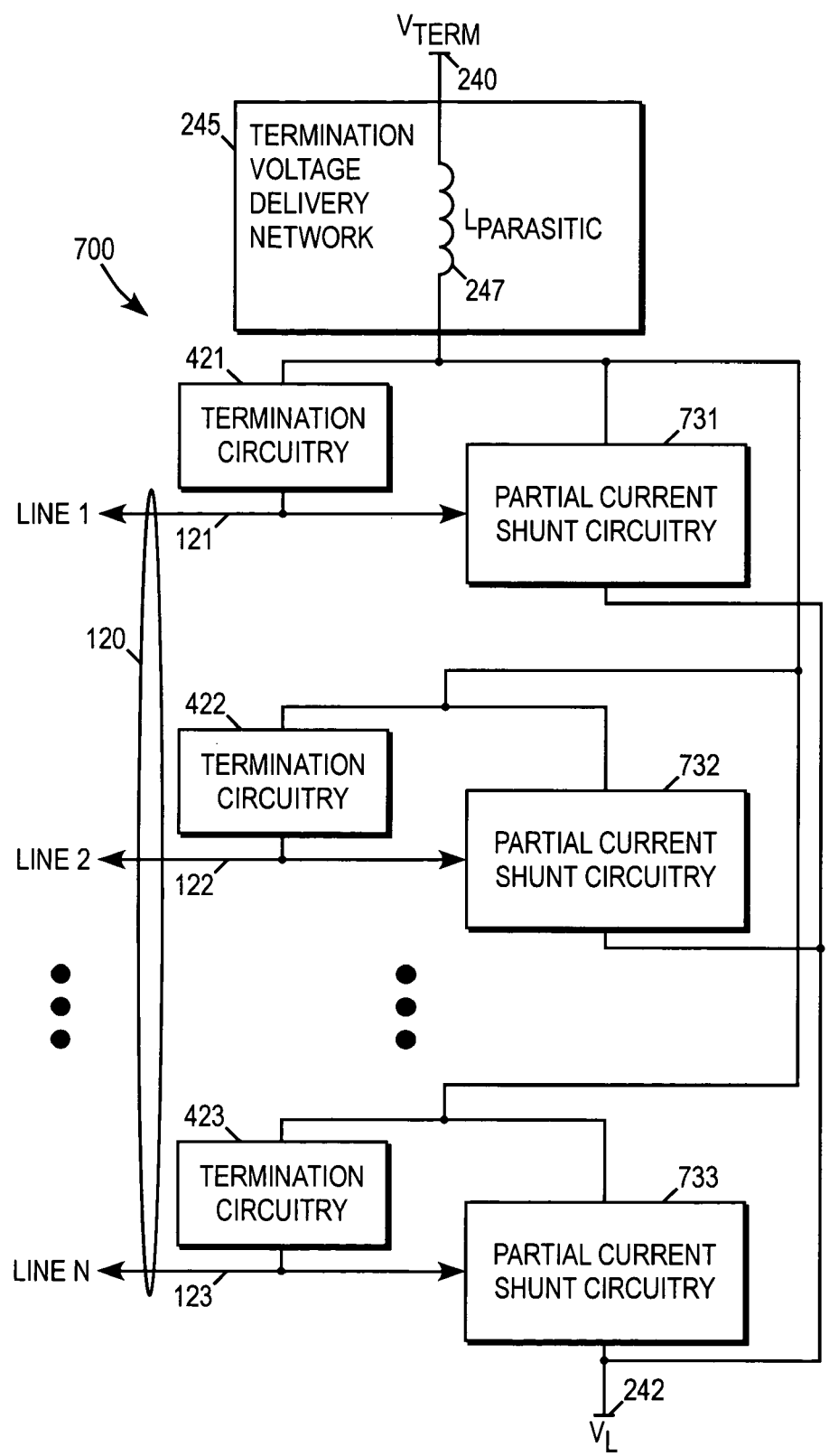
FIG. 7 illustrates, for another embodiment, a block diagram of circuitry to implement partial termination voltage current shunting.

FIG. 7 illustrates, for one embodiment, a block diagram of circuitry 700 comprising termination circuitry 421, 422, and 423 for terminated lines 121, 122, and 123, respectively, to implement termination circuitry 220 of FIG. 2 and comprising partial current shunt circuitry 731, 732, and 733 for terminated lines 121, 122, and 123, respectively, to implement partial current shunt circuitry 230 of FIG. 2.

Partial current shunt circuitry 731, 732, and 733 are each coupled between $V_{TERM}$ terminal 240 for coupling to termination voltage supply 140 (FIG. 1) and $V_L$ terminal 242 for coupling to lower voltage supply 142 (FIG. 1). Partial current shunt circuitry 731, 732, and 733 for one embodiment, as illustrated in FIG. 7, may be coupled to lines 121, 122, and 123, respectively, to shunt current from $V_{TERM}$ terminal 240 to $V_L$ terminal 242 in response to a second signal on lines 121, 122, and 123, respectively. Partial current shunt circuitry 731, 732, and 733 may comprise any suitable circuitry to shunt any suitable amount of current for terminated lines 121, 122, and 123, respectively.

Partial current shunt circuitry 731, 732, and/or 733 for one embodiment may similarly function as current shunt circuitry 431 of FIG. 6. Partial current shunt circuitry 731, 732, and 733 each draw less current than that drawn by termination circuitry 421, 422, and 423, respectively, through termination voltage delivery network 245. Partial current shunt circuitry 731, 732, and/or 733 may or may not draw the same amount of current through termination voltage delivery network 245.

Although illustrated in FIG. 7 as having partial current shunt circuitry 731, 732, and 733 for all terminated lines 121, 122, and 123, respectively, for which current is drawn through termination voltage delivery network 245, partial current shunt circuitry 230 of FIG. 2 for one embodiment may comprise partial current shunt circuitry for one or more terminated lines to draw less current than that drawn by termination circuitry for the corresponding line, may comprise current shunt circuitry for one or more terminated lines to draw approximately the same as or more current than that drawn by termination circuitry for the corresponding line, and/or may not comprise current shunt circuitry for one or more terminated lines for which current is drawn through termination voltage delivery network 245.

By drawing a suitable amount of current using partial current shunt circuitry for each of one or more terminated lines, partial current shunt circuitry 230 for one embodiment may draw a total amount of current $I_{T2}$ less than the total amount of current $I_{T1}$ that may be drawn by termination circuitry 220 through termination voltage delivery network 245 if and when a second signal appears on all terminated lines having current shunt circuitry that draws current through termination voltage delivery network 245. Partial current shunt circuitry 230 for one embodiment may therefore help define a minimum amount of current to be drawn through termination voltage delivery network 245 to help define a range of current variation through termination voltage delivery network 245. Partial current shunt circuitry 230 for one embodiment may therefore help device 110 consume less power while still helping device 110 to stabilize the supply of power from termination voltage supply 140 at a tolerable noise level.

Selective Enablement of Current Shunt Circuitry

Partial current shunt circuitry 230 for another embodiment may selectively enable current shunt circuitry for one or more terminated lines and disable current shunt circuitry for one or more other terminated lines for which current is drawn through termination voltage delivery network 245.

Figure 8:
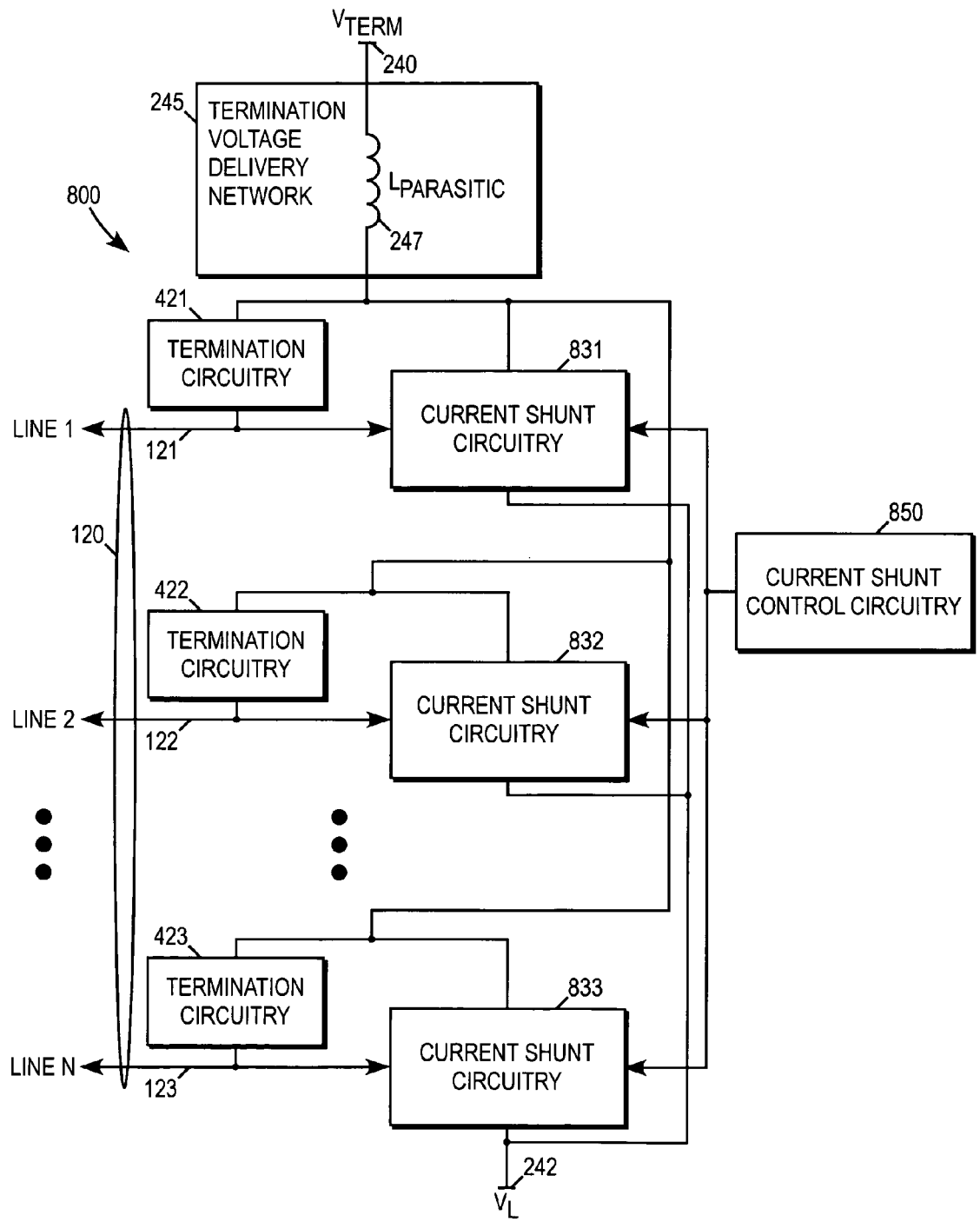
FIG. 8 illustrates, for another embodiment, a block diagram of circuitry to implement partial termination voltage current shunting.

FIG. 8 illustrates, for one embodiment, a block diagram of circuitry 800 comprising termination circuitry 421, 422, and 423 for terminated lines 121, 122, and 123, respectively, to implement termination circuitry 220 of FIG. 2 and comprising current shunt control circuitry 850 to enable or disable current shunt circuitry 831, 832, and 833 for terminated lines 121, 122, and 123, respectively, to implement partial current shunt circuitry 230 of FIG. 2.

Current shunt circuitry 831, 832, and 833 are each coupled between $V_{TERM}$ terminal 240 for coupling to termination voltage supply 140 (FIG. 1) and $V_L$ terminal 242 for coupling to lower voltage supply 142 (FIG. 1). Current shunt circuitry 831, 832, and 833 for one embodiment, as illustrated in FIG. 8, may be coupled to lines 121, 122, and 123, respectively, to shunt current from $V_{TERM}$ terminal 240 to $V_L$ terminal 242, when enabled, in response to a second signal on lines 121, 122, and 123, respectively. Current shunt circuitry 831, 832, and 833 may comprise any suitable circuitry to shunt any suitable amount of current, when enabled, for terminated lines 121, 122, and 123, respectively.

Current shunt control circuitry 850 is coupled to enable or disable current shunt circuitry 831, 832, and 833 and may comprise any suitable circuitry to enable or disable current shunt circuitry 831, 832, and 833 in any suitable manner.

Figure 9:
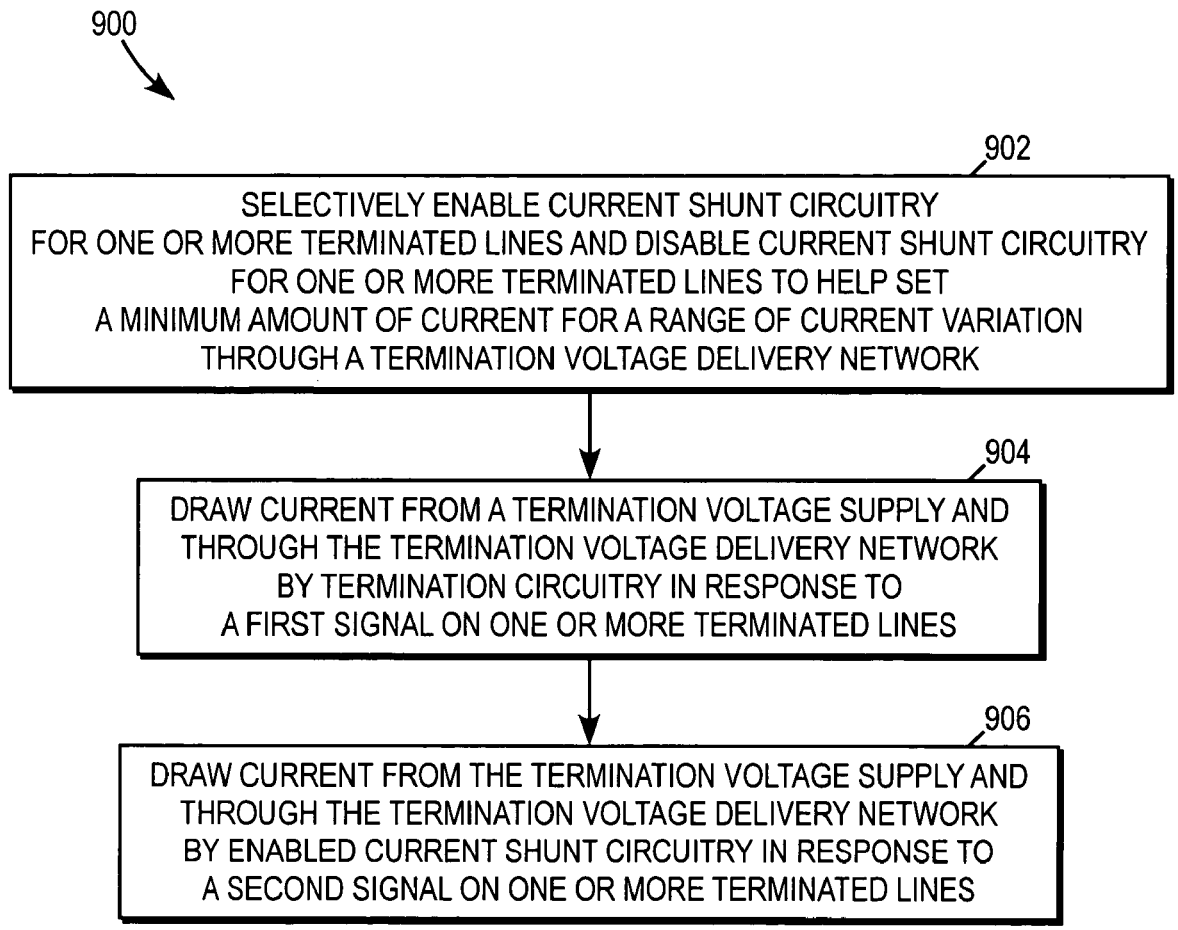
FIG. 9 illustrates, for one embodiment, a flow diagram to perform partial termination voltage current shunting using the circuitry of FIG. 8.

Circuitry 800 for one embodiment may perform partial termination voltage current shunting in accordance with a flow diagram 900 of FIG. 9.

For block 902 of FIG. 9, current shunt control circuitry 850 selectively enables current shunt circuitry 831, 832, and/or 833 for one or more terminated lines 121, 122, and/or 123, respectively, and disables current shunt circuitry 831, 832, and/or 833 for one or more terminated lines 121, 122, and/or 123, respectively. Current shunt control circuitry 850 may therefore help set the total amount of current $I_{T2}$ that partial current shunt circuitry 230 may draw through termination voltage delivery network 245 if and when a second signal appears on all of terminated lines 121, 122, and 123 for which current shunt circuitry 831, 832, and 833, respectively, is enabled. Current shunt control circuitry 850 may therefore help set a minimum amount of current to be drawn through termination voltage delivery network 245 to help define a range of current variation through termination voltage delivery network 245.

For block 904, termination circuitry 421, 422, and 423 draws current from termination voltage supply 140 and through termination voltage delivery network 245 in response to a first signal on one or more of terminated lines 121, 122, and 123, respectively.

For block 906, current shunt circuitry 831, 832, and/or 833, if and when enabled by current shunt control circuitry 850, draws current from termination voltage supply 140 and through termination voltage delivery network 245 in response to a second signal on one or more of terminated lines 121, 122, and 123, respectively.

Circuitry 800 may perform operations for blocks 902–906 in any suitable order and may or may not overlap in time the performance of any suitable operation with any other suitable operation. As one example, circuitry 800 for one embodiment may perform one or more operations for block 902 at any suitable time.

Figure 10:
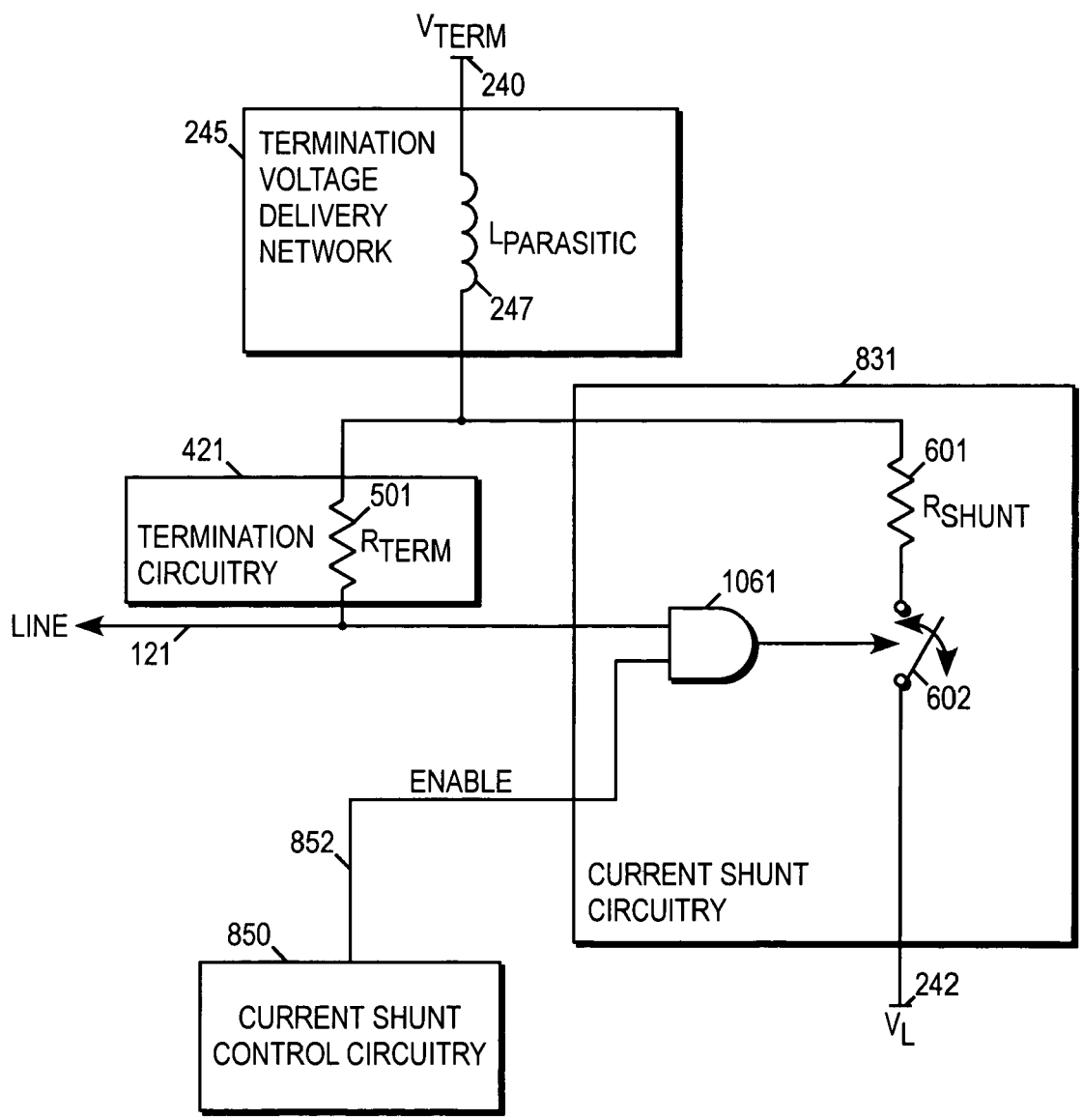
FIG. 10 illustrates, for one embodiment, a functional diagram of current shunt circuitry of FIG. 8.

As illustrated in FIG. 10, current shunt circuitry 831 for one embodiment may comprise circuitry similarly as for current shunt circuitry 431 of FIG. 6 to function as resistor 601 having a resistance $R_{SHUNT}$ coupled between $V_{TERM}$ terminal 240 and $V_L$ terminal 242 and may draw current from $V_{TERM}$ terminal 240 based on the voltage across resistor 601. Resistor 601 may have any suitable resistance $R_{SHUNT}$ to draw any suitable amount of current through termination voltage delivery network 245. Resistor 601 for one embodiment may have a resistance $R_{SHUNT}$ to draw approximately the same amount of current as that drawn by termination circuitry 421 through termination voltage delivery network 245. Resistor 601 for one embodiment may have a resistance $R_{SHUNT}$ to draw more or less current than that drawn by termination circuitry 421. Current shunt circuitry 831 for one embodiment may comprise circuitry to function as switch 602 in series with resistor 601 to couple resistor 601 between $V_{TERM}$ terminal 240 and $V_L$ terminal 242 in a selective manner based on the signal on line 121.

Current shunt circuitry 831 may comprise any suitable circuitry to allow current shunt circuitry 831 to be enabled and disabled by current shunt control circuitry 850. Current shunt circuitry 831 for one embodiment may comprise any suitable circuitry to help control switch 602 in a selective manner to allow switch 602 to be activated and deactivated based on the signal on line 121 or to deactivate switch 602 regardless of the signal on line 121.

Current shunt circuitry 831 for one embodiment, as illustrated in FIG. 10, may comprise any suitable circuitry to implement an AND gate 1061 having one input coupled to line 121, having another input coupled to an enable line 852 coupled to current shunt control circuitry 850, and having an output coupled to activate and deactivate switch 602. Switch 602 for one embodiment may then be activated and deactivated based on the signal on line 121 when current shunt control circuitry 850 generates and outputs an enable signal on enable line 852 and may be deactivated regardless of the signal on line 121 when current shunt control circuitry 850 generates and outputs a disable signal on enable line 852. For one embodiment where current shunt control circuitry 850 generates and outputs an active low enable signal, the circuitry to implement AND gate 1061 may invert the signal on enable line 852.

Current shunt circuitry 832 and/or 833 for one embodiment may similarly function as current shunt circuitry 831. Current shunt circuitry 832 and 833 may draw approximately the same current as, less current than, or more current than that drawn by termination circuitry 422 and 423, respectively, through termination voltage delivery network 245. Current shunt circuitry 831, 832, and/or 833 may or may not draw the same amount of current through termination voltage delivery network 245.

Current shunt control circuitry 850 may comprise any suitable circuitry to generate and output an enable or disable signal on each of a plurality of enable lines coupled to enable current shunt circuitry 831, 832, and 833. A single enable line may be coupled to enable any suitable one or more of current shunt circuitry 831, 832, and 833.

For one embodiment, a first, second, third, and fourth enable line may generally be coupled to enable current shunt circuitry for half, a fourth, an eighth, and an eighth of the terminated lines, respectively, for which current is drawn through termination voltage delivery network 245. For one embodiment, the first, second, third, and fourth enable lines may be coupled to current shunt circuitry for every other, every fourth, every eighth, and every eighth terminated line, respectively, for which current is drawn through termination voltage delivery network 245.

Current shunt control circuitry 850 for one embodiment may comprise a suitable memory device, such as a register for example, to store and output an enable or disable signal on each of a plurality of enable lines. The memory device for one embodiment may be written through one or more I/O lines of device 100 by any suitable device external to device 110. The memory device for one embodiment may be written by performing one or more suitable instructions by a processor of device 110.

Current shunt control circuitry 850 for one embodiment may comprise suitable circuitry comprising fuses coupled to generate and output an enable or disable signal on respective enable lines based on whether the fuse is blown. One or more fuses may be selectively blown in any suitable manner. Current shunt control circuitry 850 for one embodiment may also comprise suitable circuitry, such as a memory device for example, that may be configured to overwrite an enable or disable signal set with a fuse.

Current shunt control circuitry 850 for one embodiment may comprise suitable circuitry to enable current shunt circuitry 831, 832, and/or 833 only in response to a signal identifying device 110 as a terminating device. Such a signal may be generated, for example, by coupling an input/output (I/O) line of device 110 to a suitable voltage supply to identify that device 110 is in a terminating position relative to bus 120.

Although described as part of device 110, current shunt control circuitry 850 for another embodiment may be external to device 110 and may comprise any suitable circuitry to generate and output an enable or disable signal on enable lines input to device 110. For one embodiment, each such enable line may be coupled to a suitable voltage supply external to device 110.

Although illustrated in FIG. 8 as having current shunt circuitry for all terminated lines for which current is drawn through termination voltage delivery network 245, partial current shunt circuitry 230 of FIG. 2 for one embodiment may not comprise current shunt circuitry for one or more terminated lines for which current is drawn through termination voltage delivery network 245.

By drawing a suitable amount of current through current shunt circuitry enabled for each of one or more terminated lines but less than all terminated lines for which current is drawn through termination voltage delivery network 245, partial current shunt circuitry 230 for one embodiment may draw a total amount of current $I_{T2}$ less than the total amount of current $I_{T1}$ that may be drawn by termination circuitry 220 through termination voltage delivery network 245 if and when a second signal appears on all terminated lines having enabled current shunt circuitry that draws current through termination voltage delivery network 245. Partial current shunt circuitry 230 for one embodiment may therefore be used to help set a minimum amount of current to be drawn through termination voltage delivery network 245 to help define a range of current variation through termination voltage delivery network 245. Partial current shunt circuitry 230 for one embodiment may therefore be used to help device 110 consume less power while still helping device 110 to stabilize the supply of power from termination voltage supply 140 at a tolerable noise level.

Variable Current Shunt Circuitry for Individual Terminated Lines

Partial current shunt circuitry 230 for another embodiment may comprise variable current shunt circuitry for one or more and possibly all of the terminated lines for which current is drawn through termination voltage delivery network 245.

Figure 11:
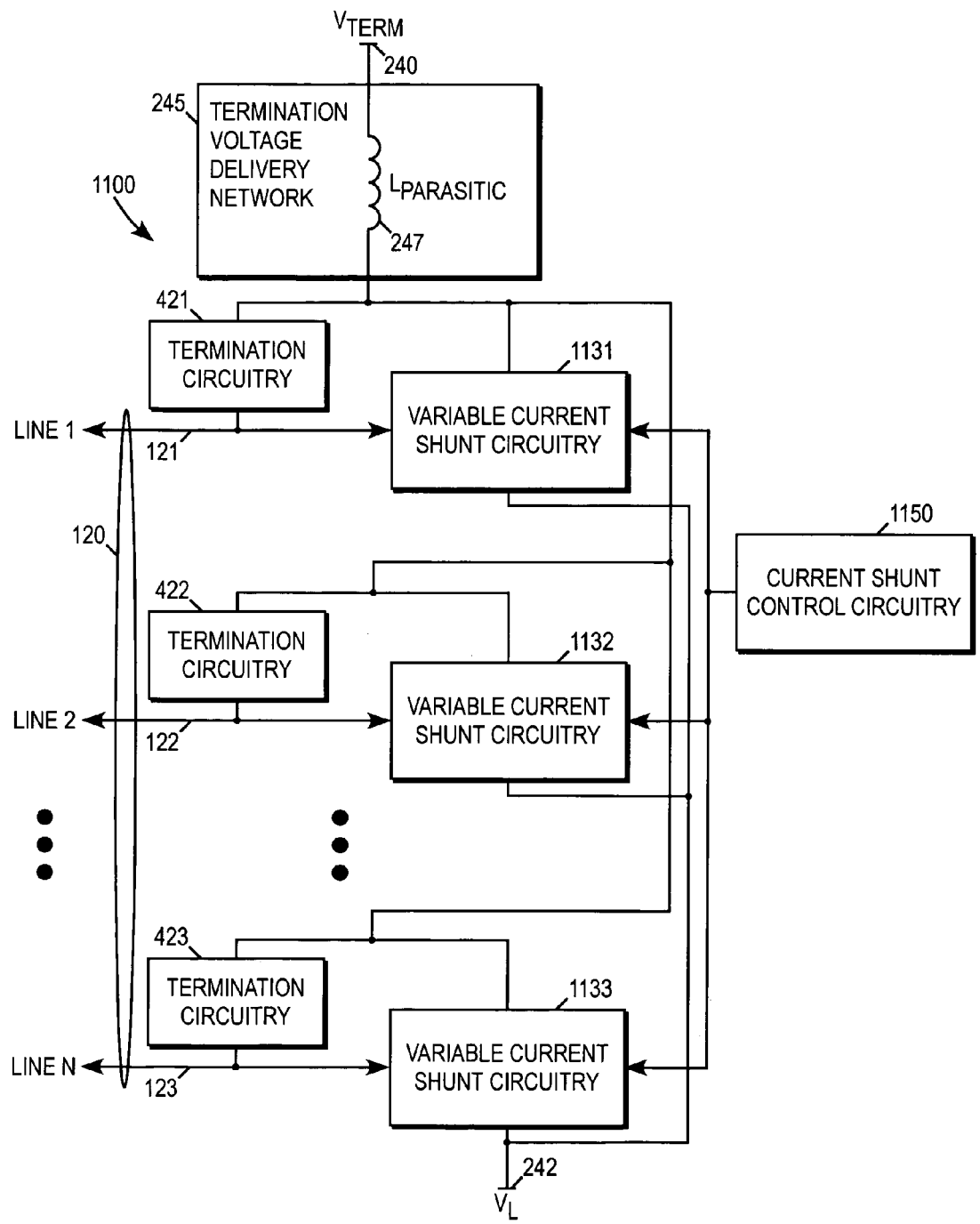
FIG. 11 illustrates, for another embodiment, a block diagram of circuitry to implement partial termination voltage current shunting.

FIG. 11 illustrates, for one embodiment, a block diagram of circuitry 1100 comprising termination circuitry 421, 422, and 423 for terminated lines 121, 122, and 123, respectively, to implement termination circuitry 220 of FIG. 2 and comprising current shunt control circuitry 1150 to control variable current shunt circuitry 1131, 1132, and 1133 for terminated lines 121, 122, and 123, respectively, to implement partial current shunt circuitry 230 of FIG. 2.

Variable current shunt circuitry 1131, 1132, and 1133 are each coupled between $V_{TERM}$ terminal 240 for coupling to termination voltage supply 140 (FIG. 1) and $V_L$ terminal 242 for coupling to lower voltage supply 142 (FIG. 1). Variable current shunt circuitry 1131, 1132, and 1133 for one embodiment, as illustrated in FIG. 11, may be coupled to lines 121, 122, and 123, respectively, to shunt current from $V_{TERM}$ terminal 240 to $V_L$ terminal 242 in response to a second signal on lines 121, 122, and 123, respectively. Variable current shunt circuitry 1131, 1132, and 1133 may comprise any suitable circuitry to shunt any suitable variable amount of current for terminated lines 121, 122, and 123, respectively.

Current shunt control circuitry 1150 is coupled to control variable current shunt circuitry 1131, 1132, and 1133 to help set an amount of current to be drawn through termination voltage delivery network 245 by variable current shunt circuitry 1131, 1132, and 1133, respectively. Current shunt control circuitry 1150 may comprise any suitable circuitry to help set any suitable amount of current to be drawn through termination voltage delivery network 245 by variable current shunt circuitry 1131, 1132, and 1133 in any suitable manner.

Figure 12:
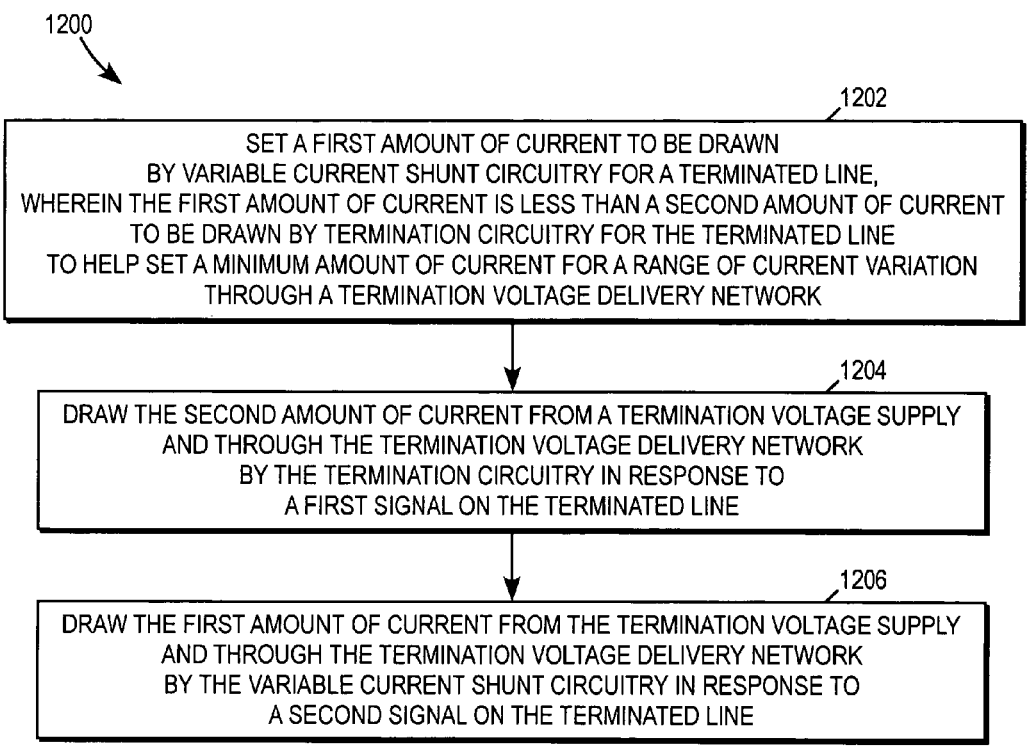
FIG. 12 illustrates, for one embodiment, a flow diagram to perform partial termination voltage current shunting using the circuitry of FIG. 11.

Circuitry 1100 for one embodiment may perform partial termination voltage current shunting in accordance with a flow diagram 1200 of FIG. 12. Although described in connection with one terminated line 121, flow diagram 1200 may be used for any one or more terminated lines for which current is drawn through termination voltage delivery network 245 by variable current shunt circuitry.

For block 1202 of FIG. 12, current shunt control circuitry 1150 controls variable current shunt circuitry 1131 to help set a first amount of current $I_1$ to be drawn through termination voltage delivery network 245. Current shunt control circuitry 1150 may control variable current shunt circuitry 1131 in any suitable manner to help set any suitable first amount of current $I_1$ to be drawn through termination voltage delivery network 245. Current shunt control circuitry 1150 may therefore help set the total amount of current $I_{T2}$ that partial current shunt circuitry 230 may draw through termination voltage delivery network 245 if and when a second signal appears on all terminated lines 121, 122, and 123. The first amount of current $I_1$ for one embodiment may be set to be less than a second amount of current $I_2$ to be drawn through termination voltage delivery network 245 by termination circuitry 421. Current shunt control circuitry 1150 may therefore help set a minimum amount of current to help define a range of current variation through termination voltage delivery network 245.

For block 1204, termination circuitry 421 draws the second amount of current $I_2$ from termination voltage supply 140 and through termination voltage delivery network 245 in response to a first signal on terminated line 121.

For block 1206, variable current shunt circuitry 1131 draws the first amount of current $I_1$ from termination voltage supply 140 and through termination voltage delivery network 245 in response to a second signal on terminated line 121.

Circuitry 1100 may perform operations for blocks 1202–1206 in any suitable order and may or may not overlap in time the performance of any suitable operation with any other suitable operation. As one example, circuitry 1100 for one embodiment may perform one or more operations for block 1202 at any suitable time.

Figure 13:
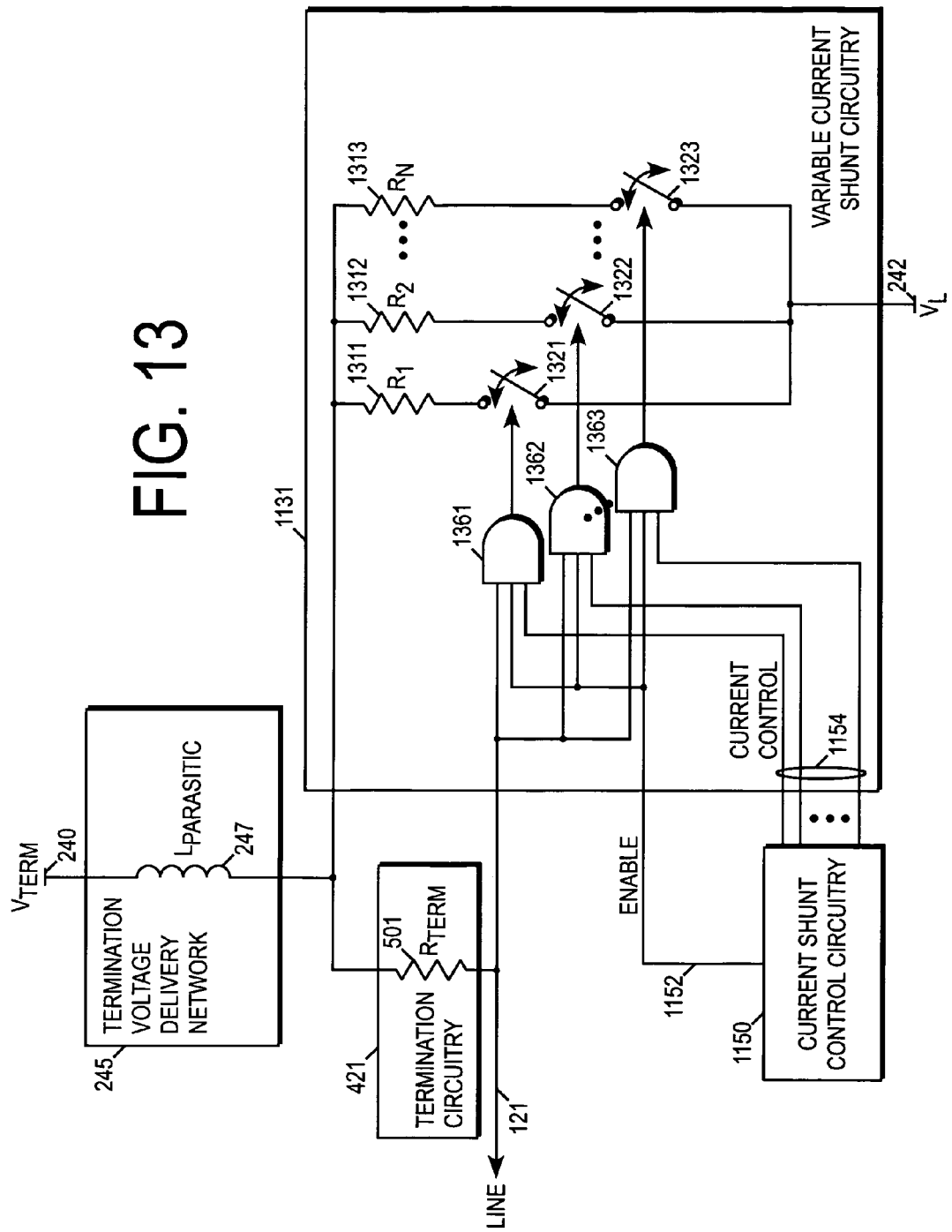
FIG. 13 illustrates, for one embodiment, a functional diagram of variable current shunt circuitry of FIG. 11.

As illustrated in FIG. 13, variable current shunt circuitry 1131 for one embodiment may comprise circuitry to function as a variable resistor having a resistance $R_{VAR}$ coupled between $V_{TERM}$ terminal 240 and $V_L$ terminal 242 and may draw current from $V_{TERM}$ terminal 240 based on the voltage across the variable resistor. Variable current shunt circuitry 1131 for one embodiment may comprise circuitry to couple the variable resistor between $V_{TERM}$ terminal 240 and $V_L$ terminal 242 in a selective manner based on the signal on line 121. For one embodiment where variable current shunt circuitry 1131 is connected directly to $V_L$ terminal 242 and to termination voltage delivery network 245 having a voltage difference $V_{NET}$ between $V_{TERM}$ terminal 240 and variable current shunt circuitry 1131, variable current shunt circuitry 1131 draws current approximately equal to $(V_{TERM} - V_{NET} - V_L)/R_{VAR}$ in response to the second signal on line 121.

Variable current shunt circuitry 1131 may comprise any suitable circuitry that may be controlled in any suitable manner to help set the variable resistance $R_{VAR}$ to any suitable one of a plurality of values and therefore draw any suitable current from $V_{TERM}$ terminal 240. As examples, variable current shunt circuitry 1131 for one embodiment may comprise any suitable circuitry that may be controlled in any suitable manner to help set the variable resistance $R_{VAR}$ to a suitable value to draw current through termination voltage delivery network 245 at any suitable value less than, or alternatively less than or equal to, approximately 100%, 95%, 90%, 85%, 80%, 75%, 70%, 65%, 60%, 55%, 50%, 45%, 40%, 35%, 30%, 25%, 20%, 15%, 10%, or 5% of the amount of current drawn by termination circuitry 421 through termination voltage delivery network 245. Variable current shunt circuitry 1131 for one embodiment may comprise any suitable circuitry that may be controlled in any suitable manner to help set the variable resistance $R_{VAR}$ to a suitable value to draw current through termination voltage delivery network 245 at any suitable value greater than, or alternatively greater than or equal to, approximately 95%, 90%, 85%, 80%, 75%, 70%, 65%, 60%, 55%, 50%, 45%, 40%, 35%, 30%, 25%, 20%, 15%, 10%, 5%, or 0% of the amount of current drawn by termination circuitry 421 through termination voltage delivery network 245. As an example where termination circuitry 421 comprises circuitry to function as resistor 501 having a resistance $R_{TERM}$ of approximately 45 ohms, the variable resistance $R_{VAR}$ may be set to one of a plurality of values in the range of approximately 45 ohms to approximately 900 ohms, for example, to draw current through termination voltage delivery network 245 in the range of approximately 100% to approximately 5% of the amount of current drawn by resistor 501 through termination voltage delivery network 245.

Variable current shunt circuitry 1131 for one embodiment may comprise circuitry to function as a network of resistors one or more of which may be selectively coupled between $V_{TERM}$ terminal 240 and $V_L$ terminal 242 to help set the variable resistance $R_{VAR}$. Each resistor in the network may have any suitable resistance. Variable current shunt circuitry 1131 for one embodiment may comprise circuitry to allow one or more resistors to be individually coupled between $V_{TERM}$ terminal 240 and $V_L$ terminal 242. When only one resistor is coupled between $V_{TERM}$ terminal 240 and $V_L$ terminal 242, the variable resistance $R_{VAR}$ is approximately equal to the resistance of that one resistor. Variable current shunt circuitry 1131 for one embodiment may comprise circuitry to allow two or more resistors to be coupled in parallel between $V_{TERM}$ terminal 240 and $V_L$ terminal 242. Generally, when a plural number N resistors having respective resistances of $R_1, R_2, \ldots, R_N$ are coupled in parallel between $V_{TERM}$ terminal 240 and $V_L$ terminal 242, the variable resistance $R_{VAR}$ is approximately equal to $1/((1/R_1)+(1/R_2)+ \ldots +(1/R_N))$.

As illustrated in FIG. 13, variable current shunt circuitry 1131 for one embodiment may comprise circuitry to function as a network of a plurality of resistors 1311, 1312, and 1313 any one of which may be individually coupled between $V_{TERM}$ terminal 240 and $V_L$ terminal 242 using a respective switch 1321, 1322, and 1323 coupled in series with resistor 1311, 1312, and 1313, respectively, between $V_{TERM}$ terminal 240 and $V_L$ terminal 242. Resistors 1311, 1312, and 1313 may have any suitable resistances $R_1$, $R_2$, and $R_3$, respectively. Variable current shunt circuitry 1131 for one embodiment may comprise circuitry to implement resistors 1311, 1312, and 1313 with suitable resistances $R_1$, $R_2$, and $R_3$ to allow the variable resistance $R_{VAR}$ to be set to one of a plurality of resistances. Although described in connection with three resistors with respective switches, variable current shunt circuitry 1131 may comprise any suitable circuitry to function as a network of any suitable number of two or more resistors with respective switches.

Variable current shunt circuitry 1131 for one embodiment may comprise circuitry to help control switches 1321, 1322, and 1323 in a selective manner to allow any one or more of switches 1321, 1322, and 1323 to be activated and deactivated based on the signal on line 121 or to deactivate any one or more of switches 1321, 1322, and 1323 regardless of the signal on line 121. In this manner, any one or more of resistors 1311, 1312, and 1313 may be selectively coupled between $V_{TERM}$ terminal 240 and $V_L$ terminal 242 to help set the variable resistance $R_{VAR}$ for variable current shunt circuitry 1131. Variable current shunt circuitry 1131 may comprise any suitable circuitry to help control switches 1321, 1322, and 1323 in this manner.

Variable current shunt circuitry 1131 for one embodiment, as illustrated in FIG. 13, may comprise any suitable circuitry to implement AND gates 1361, 1362, and 1363 each having one input coupled to line 121, having another input coupled to a respective current control line 1154 coupled to current shunt control circuitry 1150, and having an output coupled to activate and deactivate a respective one of switches 1321, 1322, and 1323. Switches 1321, 1322, and 1323 for one embodiment may then be activated and deactivated based on the signal on line 121 when current shunt control circuitry 1150 generates and outputs a first current control signal on the respective current control line 1154 for switch 1321, 1322, and 1323, respectively. Switches 1321, 1322, and 1323 for one embodiment may then be deactivated regardless of the signal on line 121 when current shunt control circuitry 1150 generates and outputs a second current control signal on the respective current control line 1154 for switch 1321, 1322, and 1323, respectively. For one embodiment where current shunt control circuitry 1150 generates and outputs an active low first current control signal, the circuitry to implement AND gates 1361, 1362, and 1363 may invert the signal on their respective input current control line 1154.

By helping to control which switches 1321, 1322, and 1323 may be activated and therefore which resistors 1311, 1312, and 1313 may be coupled between $V_{TERM}$ terminal 240 and $V_L$ terminal 242, current shunt control circuitry 1150 helps set the variable resistance $R_{VAR}$ for variable current shunt circuitry 1131.

Variable current shunt circuitry 1131 for one embodiment may also comprise circuitry to allow variable current shunt circuitry 1131 to be enabled and disabled by current shunt control circuitry 1150. Variable current shunt circuitry 1131 for one embodiment may comprise circuitry to help control switches 1321, 1322, and 1323 in a selective manner to allow all switches 1321, 1322, and 1323 to be activated and deactivated based on both the signal on line 121 and the signal on a respective current control line 1154 or to deactivate all switches 1321, 1322, and 1323 regardless of either the signal on line 121 or the signal on the respective current control line 1154. Variable current shunt circuitry 1131 may comprise any suitable circuitry to control switches 1321, 1322, and 1323 in this manner.

Variable current shunt circuitry 1131 for one embodiment, as illustrated in FIG. 13, may comprise any suitable circuitry to implement AND gates 1361, 1362, and 1363 with an additional input of each AND gate 1361, 1362, and 1363 coupled to an enable line 1152 coupled to current shunt control circuitry 1150. Switches 1321, 1322, and 1323 for one embodiment may then be activated and deactivated based on both the signal on line 121 and the signal on a respective current control line 1154 when current shunt control circuitry 1150 generates and outputs an enable signal on enable line 1152 and may be deactivated regardless of either the signal on line 121 or the signal on the respective current control line 1154 when current shunt control circuitry 1150 generates and outputs a disable signal on enable line 1152. For one embodiment where current shunt control circuitry 1150 generates and outputs an active low enable signal, the circuitry to implement AND gates 1361, 1362, and 1363 may invert the signal on enable line 1152.

Variable current shunt circuitry 1131 for another embodiment may comprise any suitable circuitry to function as a network of a plurality of resistors one or more of which may be coupled between $V_{TERM}$ terminal 240 and $V_L$ terminal 242 by a respective series-coupled switch activated in response to only the second signal on line 121 and one or more of which may be coupled between $V_{TERM}$ terminal 240 and $V_L$ terminal 242 by a respective series-coupled switch activated in response to both the second signal on line 121 and a first current control signal on a respective current control line 1154.

Variable current shunt circuitry 1132 and/or 1133 for one embodiment may similarly function as variable current shunt circuitry 1131. Variable current shunt circuitry 1132 and 1133 may or may not be set to draw the same amount of current through termination voltage delivery network 245 as variable current shunt circuitry 1131.

Current shunt control circuitry 1150 for one embodiment may comprise any suitable circuitry to enable or disable variable current shunt circuitry 1131, 1132, and 1133. Current shunt control circuitry 1150 for one embodiment may comprise suitable circuitry to generate and output an enable signal on one or more enable lines coupled to variable current shunt circuitry 1131, 1132, and 1133 in response to a signal identifying device 110 as a terminating device. Such a signal may be generated, for example, by coupling an input/output (I/O) line of device 110 to a suitable voltage supply to identify that device 110 is in a terminating position relative to bus 120. Current shunt control circuitry 1150 for one embodiment may be coupled to enable or disable variable current shunt circuitry 1131, 1132, and 1133 similarly as current shunt control circuitry 850 of FIGS. 8 and 10 may enable or disable current shunt circuitry.

Current shunt control circuitry 1150 may comprise any suitable circuitry to help set the first amount of current $I_1$ to be drawn by variable current shunt circuitry 1131, 1132, and 1133. Current shunt control circuitry 1150 for one embodiment may comprise any suitable circuitry to generate and output first and second current control signals on each of one or more current control lines coupled to control variable current shunt circuitry 1131, 1132, and 1133. A single current control line may be coupled to help control any suitable one or more of variable current shunt circuitry 1131, 1132, and/or 1133.

Current shunt control circuitry 1150 for one embodiment may comprise a suitable memory device, such as a register for example, to store and output a first or second current control signal on each of one or more current control lines. The memory device for one embodiment may be written through one or more I/O lines of device 110 by any suitable device external to device 110. The memory device for one embodiment may be written by performing one or more suitable instructions by a processor of device 110.

Current shunt control circuitry 1150 for one embodiment may comprise suitable circuitry comprising fuses coupled to generate and output a first or second current control signal on each of one or more current control lines based on whether the fuse is blown. One or more fuses may be selectively blown in any suitable manner. Current shunt control circuitry 1150 for one embodiment may also comprise suitable circuitry, such as a memory device for example, that may be configured to overwrite a first or second current control signal set with a fuse.

Although described as part of device 110, current shunt control circuitry 1150 for another embodiment may be external to device 110 and may comprise any suitable circuitry to generate and output an enable or disable signal on one or more enable lines input to device 110 and/or a first or second current control signal on one or more current control lines input to device 110. Each enable line for one embodiment may be coupled to a suitable voltage supply external to device 110. Each current control line for one embodiment may be coupled to a suitable voltage supply external to device 110.

Variable current shunt circuitry 1131 may comprise any suitable circuitry to implement resistors 1311, 1312, and 1313, switches 1321, 1322, and 1323, and AND gates 1361, 1362, and 1363.

Variable current shunt circuitry 1131 for one embodiment may comprise a transistor coupled in series between $V_{TERM}$ terminal 240 and $V_L$ terminal 242 to implement both resistor 1311 and switch 1321. The transistor may be coupled to be activated and deactivated by the output of AND gate 1361 and may have any suitable size to help define any suitable resistance $R_1$ to implement resistor 1311. Resistor 1311 and switch 1321 may be implemented using any suitable transistor, such as a suitable field effect transistor (FET) for example. Resistor 1311 and switch 1321 for one embodiment may be implemented using an n-channel metal oxide semiconductor FET (n-MOSFET).

Resistor 1312 and switch 1322 for one embodiment may be similarly implemented using a transistor coupled in series between $V_{TERM}$ terminal 240 and $V_L$ terminal 242 and coupled to be activated and deactivated by the output of AND gate 1362. The transistor may have any suitable size to help define any suitable resistance $R_2$ to implement resistor 1312.

Resistor 1313 and switch 1323 for one embodiment may be similarly implemented using a transistor coupled in series between $V_{TERM}$ terminal 240 and $V_L$ terminal 242 and coupled to be activated and deactivated by the output of AND gate 1363. The transistor may have any suitable size to help define any suitable resistance $R_3$ to implement resistor 1313.

Variable current shunt circuitry 1131 for one embodiment may implement AND gates 1361, 1362, and 1363 using any suitable semiconductor technology, such as complementary metal oxide semiconductor (CMOS) technology for example.

Figure 14:
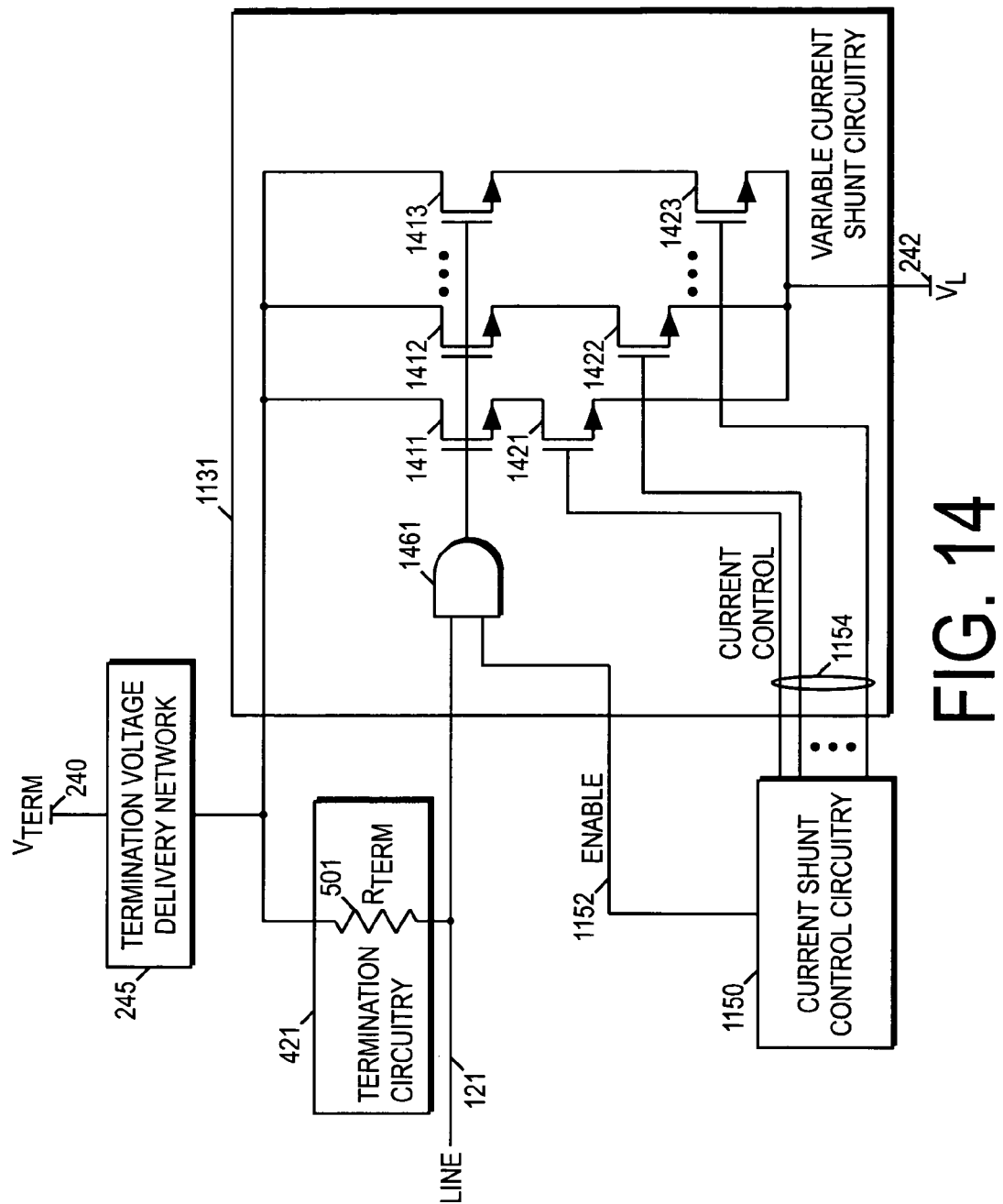
FIG. 14 illustrates, for one embodiment, circuitry to implement the variable current shunt circuitry of FIG. 13.

Variable current shunt circuitry 1131 for another embodiment may be implemented in accordance with the example circuitry illustrated in FIG. 14.

As illustrated in FIG. 14, variable current shunt circuitry 1131 for one embodiment may comprise n-channel metal oxide semiconductor field effect transistors (n-MOSFETs) 1411 and 1421 coupled in series between $V_{TERM}$ terminal 240 and $V_L$ terminal 242 to implement resistor 1311, switch 1321, and the AND operation with the signal on line 121 and the signal on a first current control line 1154; n-MOSFETs 1412 and 1422 to implement resistor 1312, switch 1322, and the AND operation with the signal on line 121 and the signal on a second current control line 1154; and n-MOSFETs 1413 and 1423 to implement resistor 1313, switch 1323, and the AND operation with the signal on line 121 and the signal on a third current control line 1154.

N-MOSFETs 1411 and 1421 may have any suitable size to help define any suitable resistance $R_1$ for resistor 1311. N-MOSFETs 1412 and 1422 may have any suitable size to help define any suitable resistance $R_2$ for resistor 1312. N-MOSFETs 1413 and 1423 may have any suitable size to help define any suitable resistance $R_3$ for resistor 1313.

N-MOSFETs 1411, 1412, and 1413 for one embodiment may have a gate coupled to receive the signal on line 121, and n-MOSFETs 1421, 1422, and 1423 for embodiment may have a gate coupled to receive the signal on a respective current control line 1154. Current shunt control circuitry 1150 may therefore selectively activate any one or more of n-MOSFETs 1421, 1422, and 1423 to help couple n-MOSFET 1411, 1412, and/or 1413, respectively, between $V_{TERM}$ terminal 240 and $V_L$ terminal 242 and therefore help set the variable resistance $R_{VAR}$ between $V_{TERM}$ terminal 240 and $V_L$ terminal 242 when n-MOSFETs 1411, 1412, and 1413 are activated in response to a second signal on line 121.

Although described in connection with using n-MOSFETs, variable current shunt circuitry 1131 for another embodiment may be implemented using any suitable transistors including any suitable field effect transistors (FETs) for example.

Variable current shunt circuitry 1131 for one embodiment may comprise any suitable circuitry to implement an AND operation with the signal on line 121 and the signal on enable line 1152. Variable current shunt circuitry 1131 for one embodiment may comprise any suitable circuitry to implement an AND gate 1461 having one input coupled to line 121, having another input coupled to enable line 1152, and having an output coupled to activate and deactivate n-MOSFETs 1411, 1412, and 1413. For one embodiment where current shunt control circuitry 1150 generates and outputs an active low enable signal, the circuitry to implement AND gate 1461 may invert the signal on enable line 1152.

Variable current shunt circuitry 1131 for one embodiment may implement AND gate 1461 using any suitable semiconductor technology, such as complementary metal oxide semiconductor (CMOS) technology for example. Variable current shunt circuitry 1131 for one embodiment may implement AND gate 1461' using a respective n-MOSFET coupled in series with each n-MOSFET pair 1411 and 1421, 1412 and 1422, and 1413 and 1423 and having a gate coupled to enable line 1152 to couple each respective n-MOSFET pair 1411 and 1421, 1412 and 1422, and 1413 and 1423 between $V_{TERM}$ terminal 240 and $V_L$ terminal 242 in response to an enable signal on enable line 1152.

Although illustrated in FIG. 11 as having variable current shunt circuitry 1131, 1132, and 1133 for all terminated lines 121, 122, and 123, respectively, for which current is drawn through termination voltage delivery network 245, partial current shunt circuitry 230 of FIG. 2 for one embodiment may comprise variable current shunt circuitry for one or more terminated lines to draw approximately the same current as, less current than, or more current than that drawn by termination circuitry for the corresponding line, may comprise current shunt circuitry for one or more terminated lines to draw approximately the same current as, less current than, or more current than that drawn by termination circuitry for the corresponding line, and/or may not comprise current shunt circuitry for one or more terminated lines for which current is drawn through termination voltage delivery network 245.

By drawing a suitable amount of current using variable current shunt circuitry for each of one or more terminated lines, partial current shunt circuitry 230 for one embodiment may draw a total amount of current $I_{T2}$ less than the total amount of current $I_{T1}$ that may be drawn by termination circuitry 220 through termination voltage delivery network 245 if and when a second signal appears on all terminated lines having current shunt circuitry that draws current through termination voltage delivery network 245. Partial current shunt circuitry 230 for one embodiment may therefore help define a minimum amount of current to be drawn through termination voltage delivery network 245 to help define a range of current variation through termination voltage delivery network 245. Partial current shunt circuitry 230 for one embodiment may therefore help device 110 consume less power while still helping device 110 to stabilize the supply of power from termination voltage supply 140 at a tolerable noise level.

PVT Control

Figure 15:
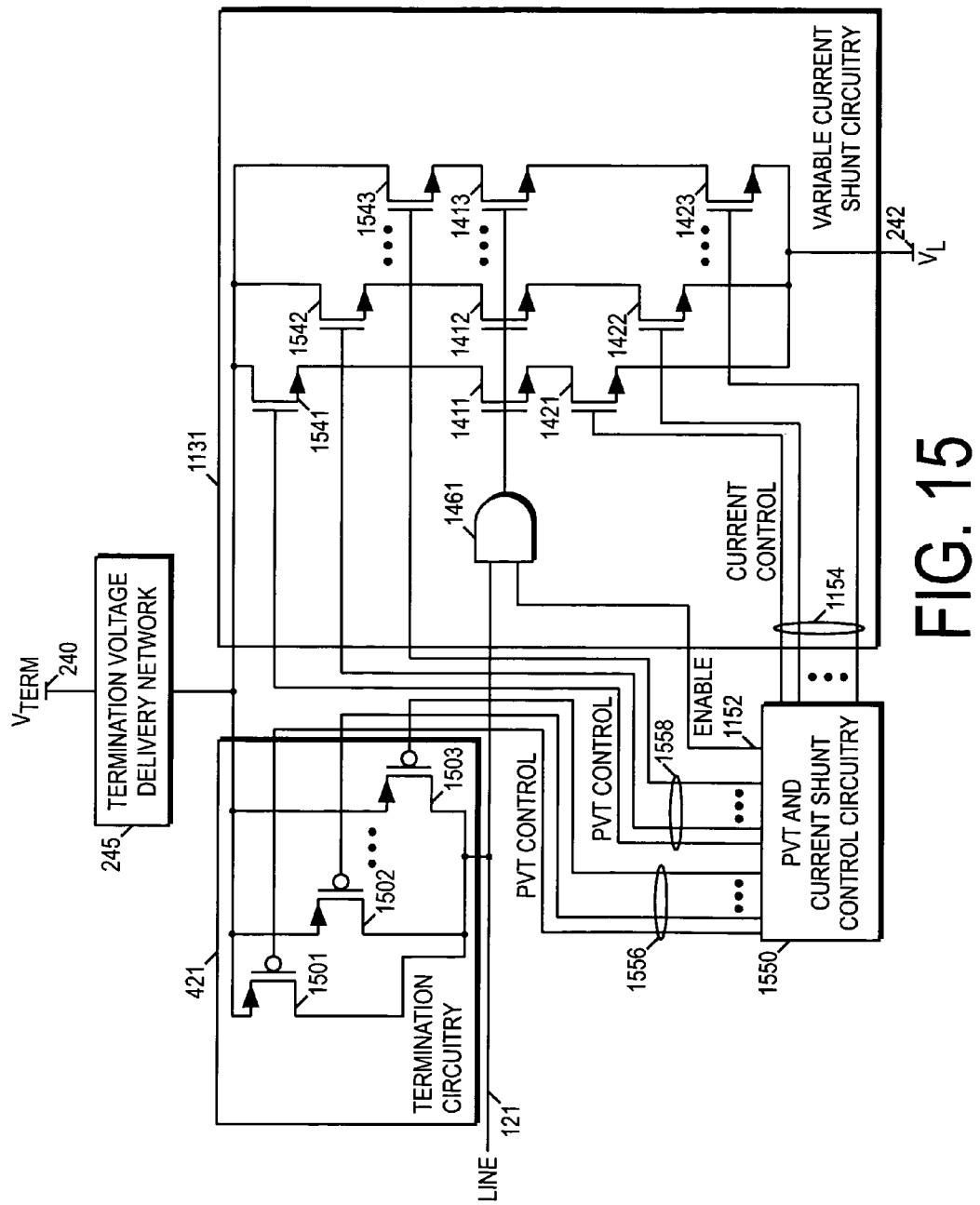
FIG. 15 illustrates, for another embodiment, circuitry that helps compensate for process, voltage, and/or temperature (PVT) variations to implement the variable current shunt circuitry of FIG. 13.

Termination circuitry 421 and variable current shunt circuitry 1131 for one embodiment may be implemented in accordance with the example circuitry of FIG. 15 to help compensate for variations in process, variations in supply voltage, and/or variations in temperature of device 110. Such variations are known as process, voltage, and/or temperature (PVT) variations.

Termination circuitry 421 for one embodiment, as illustrated in FIG. 15, may comprise p-channel metal oxide semiconductor field effect transistors (p-MOSFETs) 1501, 1502, and 1503 each coupled between $V_{TERM}$ terminal 240 and line 121 to implement resistor 501. P-MOSFETs 1501, 1502, and 1503 have a gate coupled to a respective PVT control line 1556 coupled to PVT and current shunt control circuitry 1550 and may be activated or deactivated when PVT and current shunt control circuitry 1550 generates and outputs a first or second PVT control signal, respectively, on the respective PVT control line 1556. PVT and current shunt control circuitry 1550 may generate first and/or second PVT control signals in any suitable manner to activate any suitable one or more of p-MOSFETs 1501, 1502, and 1503 to help set and maintain the resistance $R_{TERM}$ between $V_{TERM}$ terminal 240 and line 121 at approximately the same value of resistance in the presence of PVT variations. P-MOSFETs 1501, 1502, and 1503 may have any suitable size to help allow PVT and current shunt control circuitry 1550 to help set and maintain the resistance $R_{TERM}$ for termination circuitry 421 at approximately any suitable value. Although described in connection with three p-MOSFETs, termination circuitry 421 may be implemented using any suitable number of any suitable transistors, including any suitable field effect transistors (FETs) for example.

Variable current shunt circuitry 1131 for one embodiment, as illustrated in FIG. 15, may comprise the example circuitry of FIG. 14 with a respective n-channel metal oxide semiconductor field effect transistor (n-MOSFET) 1541, 1542, and 1543 coupled in series with n-MOSFET pairs 1411 and 1421, 1412 and 1422, and 1413 and 1423. N-MOSFETs 1541, 1542, and 1543 have a gate coupled to a respective PVT control line 1558 coupled to PVT and current shunt control circuitry 1550 and may be activated or deactivated when PVT and current shunt control circuitry 1550 generates and outputs a first or second PVT control signal, respectively, on the respective PVT control line 1558. PVT and current shunt control circuitry 1550 may generate first and/or second PVT control signals in any suitable manner to activate any suitable one or more of n-MOSFETs 1541, 1542, and 1543 to help couple n-MOSFET pairs 1411 and 1421, 1412 and 1422, and/or 1413 and 1423, respectively, between $V_{TERM}$ terminal 240 and $V_L$ terminal 242 and therefore help set and maintain the resistance $R_{VAR}$ between $V_{TERM}$ terminal 240 and $V_L$ terminal 242 at approximately the same value of resistance in the presence of PVT variations. N-MOSFETs 1411, 1412, 1413, 1421, 1422, 1423, 1541, 1542, and 1543 may have any suitable size to help allow PVT and current shunt control circuitry 1550 to help set and maintain the resistance $R_{VAR}$ for variable current shunt circuitry 1131 at approximately any suitable value. Although described in connection with n-MOSFETs, variable current shunt circuitry 1131 may use any suitable transistors, including any suitable field effect transistors (FETs) for example, to help compensate for PVT variations.

Figure 16:
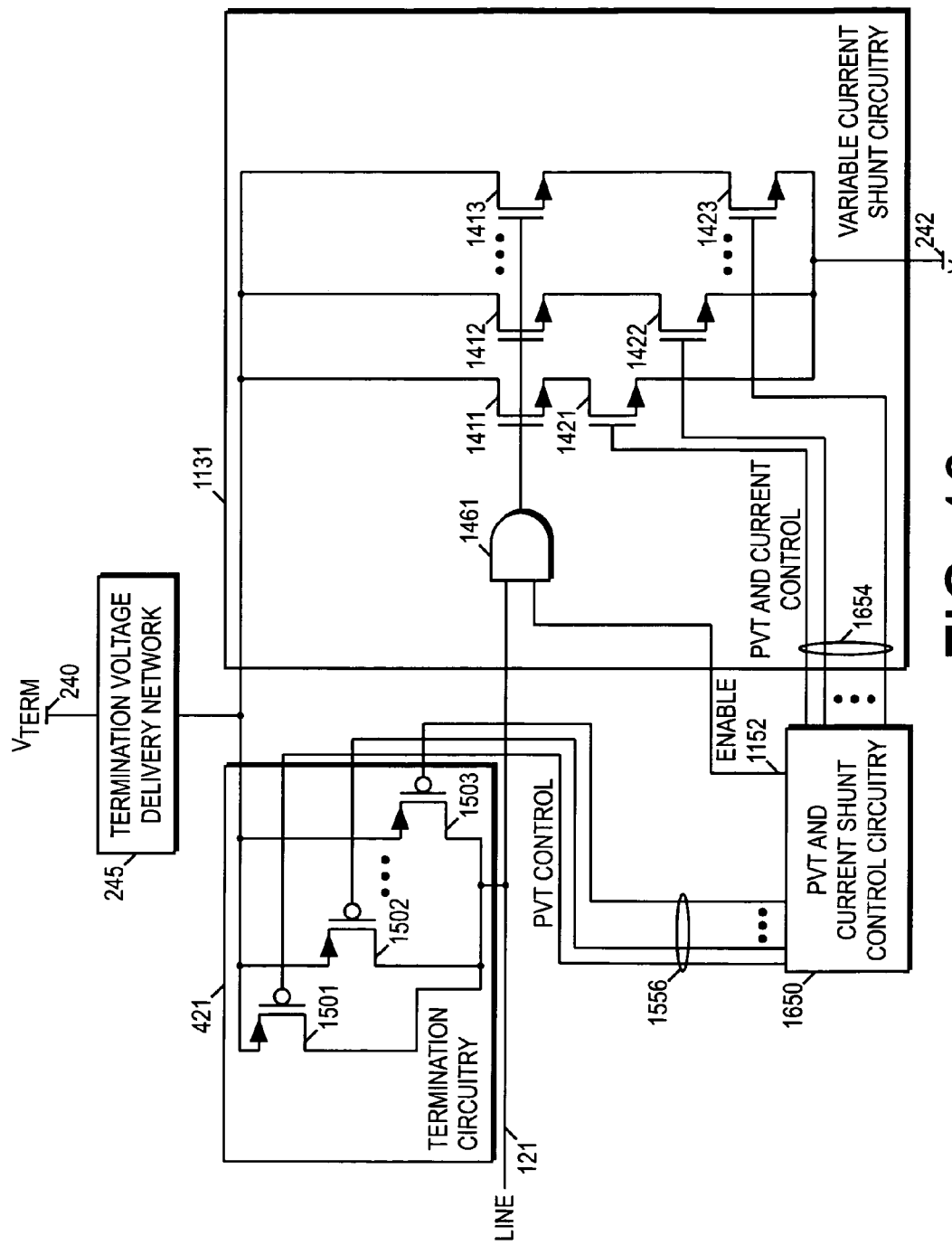
FIG. 16 illustrates, for another embodiment, circuitry that helps compensate for process, voltage, and/or temperature (PVT) variations to implement the variable current shunt circuitry of FIG. 13.

Variable current shunt circuitry 1131 for another embodiment, as illustrated in FIG. 16, may comprise the example circuitry of FIG. 14 and help compensate for PVT variations by having the gate of n-MOSFETs 1421, 1422, and 1423 coupled to a respective PVT and current control line 1654 coupled to PVT and current shunt control circuitry 1650. N-MOSFETs 1421, 1422, and 1423 may then be activated or deactivated when PVT and current shunt control circuitry 1650 generates and outputs a first or second PVT and current control signal, respectively, on the respective PVT and current control line 1654. PVT and current shunt control circuitry 1650 may generate first and/or second PVT and current control signals in any suitable manner to activate any suitable one or more of n-MOSFETs 1421, 1422, and 1423 to help couple n-MOSFET 1411, 1412, and/or 1413, respectively, between $V_{TERM}$ terminal 240 and $V_L$ terminal 242 and therefore help set and maintain the resistance $R_{VAR}$ between $V_{TERM}$ terminal 240 and $V_L$ terminal 242 at approximately the same value of resistance in the presence of PVT variations. PVT and current shunt control circuitry 1650 for one embodiment may identify a set of PVT control signals and a set of current control signals and perform an AND operation on the sets of signals to generate a set of PVT and current control signals. N-MOSFETs 1411, 1412, 1413, 1421, 1422, and 1423 may have any suitable size to help allow PVT and current shunt control circuitry 1650 to help set and maintain the resistance $R_{VAR}$ for variable current shunt circuitry 1131 at approximately any suitable value.

In the foregoing description, one or more embodiments of the present invention have been described. It will, however, be evident that various modifications and changes may be made thereto without departing from the broader spirit or scope of the present invention as defined in the appended claims. The specification and drawings are, accordingly, to be regarded in an illustrative rather than a restrictive sense.

What is claimed is:

1. A method comprising:
   providing a plurality of lines terminated by termination circuitry, wherein at least one line has an associated current shunt;
   drawing a first current from a termination voltage supply through a termination voltage delivery network to the termination circuitry for each line carrying a first signal; and
   drawing a second current from the termination voltage supply through the termination voltage delivery network to the associated current shunt for each line carrying a second signal, wherein the first and second currents are distinct.

2. The method of claim 1, wherein the second current is variable for each current shunt.

3. The method of claim 2 comprising varying the second current in response to a process, voltage, and temperature (PVT) compensation signal.

4. The method of claim 1 wherein the termination circuitry resides within an integrated circuit.

5. The method of claim 1 wherein each of the plurality of lines has an associated current shunt.

6. The method of claim 5 wherein the second current associated with each current shunt is variable.

7. The method of claim 6 wherein the first current associated with each line is distinct from the second current associated with that line.

8. An apparatus comprising: termination circuitry to terminate one or more of a plurality of lines, the termination circuitry drawing a first current from a termination voltage supply through a termination voltage delivery network for each terminated line carrying a first signal; and current shunt drawing a second current from the termination voltage supply through the termination voltage delivery network for each terminated line carrying a second signal, wherein the first and second currents are distinct.

9. The apparatus of claim 8, wherein the second current is variable.

10. The apparatus of claim 8 comprising:
    process/voltage/temperature (PVT) control circuitry, wherein the current shunt varies the second current in response to a PVT control signal generated by the PVT control circuitry.

11. The apparatus of claim 8 wherein the termination circuitry resides within an integrated circuit.

12. The apparatus of claim 8 wherein each of the plurality of lines has an associated current shunt.

13. The apparatus of claim 12 wherein the second current associated with each current shunt is variable.

14. The apparatus of claim 12 wherein the first current associated with each line is distinct from the second current associated with that line.

15. An apparatus comprising: a bus comprising at least one line; a termination voltage supply; and a plurality of devices coupled to the bus, wherein at least one device is a terminating device comprising; termination circuitry coupled to the termination voltage supply to terminate at least one line of the bus a current shunt to selectively shunt current away from the termination circuitry for the at least one line, wherein a first current drawn by the termination circuitry from the termination voltage supply in response to a selected line carrying a first signal is distinct from a second current shunted away from the termination circuitry when the selected line is carrying a second signal, wherein the first and second currents are different.

16. The apparatus of claim 15 wherein at least one of the plurality of devices is an integrated circuit.

17. The apparatus of claim 15 wherein the at least one terminating device is an integrated circuit.

18. The apparatus of claim 15 further comprising non-terminating devices coupled to the bus.

19. The apparatus of claim 18 wherein the non-terminating devices include at least one integrated circuit.

20. The apparatus of claim 15 further comprising:
    process/voltage/temperature (PVT) control circuitry, wherein the current shunt varies the second current in response to a PVT control signal generated by the PVT control circuitry.

* * * * *

UNITED STATES PATENT AND TRADEMARK OFFICE
CERTIFICATE OF CORRECTION

PATENT NO. : 7,088,130 B2  Page 1 of 1
APPLICATION NO. : 11/242402
DATED : August 8, 2006
INVENTOR(S) : Barry J. Arnold It is certified that error appears in the above-identified patent and that said Letters Patent is hereby corrected as shown below:

In column 12, line 24, delete "100" and insert -- 110 --, therefor.

In column 19, line 20, delete "1461'" and insert -- 1461 --, therefor.

Signed and Sealed this

Third Day of March, 2009

JOHN DOLL
*Acting Director of the United States Patent and Trademark Office*